US012261360B2

(12) United States Patent
Runyon et al.

(10) Patent No.: US 12,261,360 B2
(45) Date of Patent: Mar. 25, 2025

(54) ANTENNA ARRAY WITH DUAL-POLARIZED PARALLEL PLATE SEPTUM POLARIZER

(71) Applicant: Viasat Inc., Carlsbad, CA (US)

(72) Inventors: Donald L Runyon, Duluth, GA (US); Matthew J. Miller, Flowery Branch, GA (US); Jeremy D. Standridge, Hoschton, GA (US)

(73) Assignee: Viasat, Inc., Carlsbad, CA (US)

( * ) Notice: Subject to any disclaimer, the term of this patent is extended or adjusted under 35 U.S.C. 154(b) by 105 days.

(21) Appl. No.: 18/037,971

(22) PCT Filed: Dec. 14, 2021

(86) PCT No.: PCT/US2021/063364
§ 371 (c)(1),
(2) Date: May 19, 2023

(87) PCT Pub. No.: WO2022/132805
PCT Pub. Date: Jun. 23, 2022

(65) Prior Publication Data

US 2023/0411860 A1 Dec. 21, 2023

Related U.S. Application Data

(60) Provisional application No. 63/125,375, filed on Dec. 14, 2020, provisional application No. 63/125,379, filed on Dec. 14, 2020.

(51) Int. Cl.
*H01Q 13/02* (2006.01)
*H01Q 1/28* (2006.01)
(Continued)

(52) U.S. Cl.
CPC ........... *H01Q 13/0258* (2013.01); *H01Q 1/28* (2013.01); *H01Q 13/0241* (2013.01); *H01Q 21/064* (2013.01); *H01Q 21/24* (2013.01)

(58) Field of Classification Search
CPC .. H01Q 1/28; H01Q 13/0241; H01Q 13/0258; H01Q 21/064; H01Q 21/067; H01Q 21/08; H01Q 21/24
See application file for complete search history.

(56) References Cited

U.S. PATENT DOCUMENTS

| | | | |
|---|---|---|---|
| 3,958,192 A | 5/1976 | Rootsey | |
| 6,861,997 B2 | 3/2005 | Mahon | |

(Continued)

FOREIGN PATENT DOCUMENTS

| | | | |
|---|---|---|---|
| CN | 111864397 A | 10/2020 | |
| EP | 3098899 A1 * | 11/2016 | .............. H01P 1/161 |

OTHER PUBLICATIONS

Mao Ningxin et al., "A Circularly Polarized Antenna Element Based on Open-ended Waveguide", 2019 IEEE Asia-Pacific Microwave Conference (APMC), IEEE, Dec. 10, 2019, pp. 237-239, XP033742160, DOI: 10.1109/apmc45664.2019.9038849 [retrieved on Mar. 16, 2020] section II.; p. 237-p. 238; figure 1.

(Continued)

*Primary Examiner* — Hoang V Nguyen
(74) *Attorney, Agent, or Firm* — Holland & Hart LLP

(57) ABSTRACT

Methods, systems, and devices for a dual-polarized antenna array are described. An example antenna array may include a parallel plate polarizer that may include upper and lower plates. The antenna array may include stepped septums extending between the plates, each of the stepped septums having a first and second side surfaces, the stepped septums comprising first and second sets that are inverted relative to each other. The antenna array may include a first divided waveguides associated with a first polarization that may have a first set of opposing walls formed by first portions of the upper and lower plates and a second set of opposing walls. The antenna array may include second divided waveguides associated with a second polarization that may have (Continued)

a first set of opposing walls formed by second portions of the upper and lower plates and a second set of opposing walls.

21 Claims, 25 Drawing Sheets

(51) Int. Cl.
*H01Q 21/06* (2006.01)
*H01Q 21/24* (2006.01)

(56) References Cited

U.S. PATENT DOCUMENTS

| | | | |
|---|---|---|---|
| 8,988,300 | B2 | 3/2015 | Runyon et al. |
| 9,843,098 | B2 | 12/2017 | Co |
| 10,096,904 | B2 | 10/2018 | Bongard et al. |
| 2006/0170596 | A1 | 8/2006 | Habib et al. |
| 2017/0047661 | A1* | 2/2017 | Parekh ................. H01Q 19/028 |
| 2017/0263991 | A1* | 9/2017 | Jensen .................... H01P 1/173 |

OTHER PUBLICATIONS

International Search Report and Written Opinion, PCT/US2021/063364 dated Apr. 20, 2022, 15 pages.

International Preliminary Report on Patentability, PCT/US2021/063364 dated Nov. 4, 2022, 20 pages.

* cited by examiner

ANTENNA ARRAY WITH DUAL-POLARIZED PARALLEL PLATE SEPTUM POLARIZER

CROSS REFERENCE TO RELATED APPLICATIONS

The present application for patent is a 371 national stage filing of International Patent Application No. PCT/US2021/063364, entitled "Antenna Array With Dual-Polarized Parallel Plate Septum Polarizer", filed Dec. 14, 2021, which claims priority to U.S. Provisional Application No. 63/125,375, entitled "Antenna Array with Dual-Polarized Parallel Plate Septum Polarizer," which was filed on Dec. 14, 2020 and to U.S. Provisional Application No. 63/125,379, entitled "Digital Antenna Array with Dual-Polarized Parallel Plate Septum Polarizer," which was filed on Dec. 14, 2020, each of which is assigned to the assignee hereof, and the contents of which are hereby incorporated by reference for any purpose in their entirety.

BACKGROUND

The following relates to antenna arrays, and more specifically to antenna arrays with dual-polarized parallel plate septum polarizers.

Antenna array technology including apertures and waveguide with waveguide feed networks are becoming an important communication tool because such antenna arrays exhibit low level of losses. These antenna arrays represent one of the most suited technologies for passive arrays because of the low level of losses they exhibit. Applications requiring a significant bandwidth may use feed networks of the corporate type in order to provide equal amplitude and phase to all the elements in the array. As the number of antenna elements increases, the waveguide feed networks become increasingly complex, costly, heavy, and space consuming. This can be problematic in many environments (e.g., avionics) where space and/or weight are at a premium. In some cases, inter-element distance may be constrained by the feed network size, which may degrade antenna performance.

SUMMARY

Methods, systems, and devices are described for dual-polarized parallel plate septum polarizers for an antenna array. The dual-polarized parallel plate septum polarizers may be formed using parallel plates and plates of septums that are arranged in alternating orientations. The septums may create dual polarization and form divided waveguides for two different types of polarization. These plates may form linear arrays that can be stacked together.

There may be no walls that separate the septums from each other. The grids may be tiled and stacked together to form larger arrays. The antenna array may be passive or active. For active antenna arrays, circuit cards may be snapped to the tiles.

In a first set of illustrative examples, a dual-polarized antenna array is described. In one configuration, the dual-polarized antenna array includes a parallel plate polarizer. The parallel plate polarizer may include an upper plate having a first surface and a lower plate that is parallel to the upper plate and has a second surface opposing the first surface of the upper plate, wherein the lower plate is parallel to the upper plate. The dual-polarized antenna array may include a plurality of stepped septums extending from the first surface of the upper plate to the second surface of the lower plate, each of the plurality of stepped septums having a first side surface and a second side surface, the plurality of stepped septums comprising a first set of stepped septums and a second set of stepped septums that are inverted relative to the first set of stepped septums. The dual-polarized antenna array may include a plurality of first divided waveguides associated with a first polarization, each of the plurality of first divided waveguides having a first set of opposing walls formed by a first portion of the first surface of the upper plate and a first portion of the second surface of the lower plate and a second set of opposing walls formed by a portion of the first side surface of one of the first set of stepped septums and a portion of the first side surface of one of the second set of stepped septums. The dual-polarized antenna array may include a plurality of second divided waveguides associated with a second polarization, each of the plurality of second divided waveguides having a first set of opposing walls formed by a second portion of the first surface of the upper plate and a second portion of the second surface of the lower plate and a second set of opposing walls formed by a portion of the second side surface of one of the first set of stepped septums and a portion of the second side surface of one of the second set of stepped septums.

Some examples of the dual-polarized antenna array include a plurality of parallel plate polarizers comprising the parallel plate polarizer, wherein, for at least a subset of the plurality of parallel plate polarizers the upper plate of one of a pair of adjacent parallel plate polarizers and the lower plate of the other one of the pair of adjacent parallel plate polarizers are a same plate.

In some examples of the dual-polarized antenna array, the plurality of stepped septums for the one of the pair of adjacent parallel plate polarizers are aligned with the plurality of stepped septums for the other one of the pair of adjacent parallel plate polarizers in a dimension parallel to the upper and lower plates of the first parallel plate polarizer. In other examples, the plurality of stepped septums for the one of the pair of adjacent parallel plate polarizers are offset from the plurality of stepped septums for the other one of the pair of adjacent parallel plate polarizers in a dimension parallel to the upper and lower plates of the plurality of parallel plate polarizers.

Some examples of the dual-polarized antenna array include a plurality of antenna feeds within respective waveguides of the plurality of first divided waveguides and the plurality of second divided waveguides.

Some examples of the dual-polarized antenna array include a plurality of circuit cards, wherein each of the plurality of circuit cards is coupled with a subset of the plurality of antenna feeds. In some examples, each of the plurality of circuit cards comprises an electrical beam forming network. In some examples of the dual-polarized antenna array, the electrical beam forming network of the each of the plurality of circuit cards comprises a plurality of beamforming circuits, each beamforming circuit associated with one or more of the antenna feeds.

Some examples of the dual-polarized antenna array include a plurality of distribution circuits, wherein each of the plurality of distribution circuits is coupled with at least a subset of the plurality of circuit cards and provides a first signal associated with the first polarization and a second signal associated with the second polarization to the at least the subset of the plurality of circuit cards. In some examples, each of the plurality of circuit cards is coupled with the subset of the plurality of antenna feeds that are within the respective waveguides of the plurality of first divided waveguides and the plurality of second divided waveguides for one parallel plate polarizer of the plurality of parallel plate polarizers. In some examples, each of the plurality of circuit cards comprises a plurality of analog-to-digital converters (ADCs) and a plurality of digital-to-analog converters (DACs), and wherein each of the plurality of ADCs and the plurality of DACs is coupled with one or more of the plurality of antenna feeds.

Some examples of the dual-polarized antenna array include a first waveguide feed network coupled between a first common port and the plurality of first divided waveguides and a second waveguide feed network coupled between a second common port and the plurality of second divided waveguides.

In some examples, the dual-polarized antenna array may include a plurality of parallel assemblies, wherein each parallel assembly comprises a stepped septum from each of the plurality of parallel plate polarizers and at least a portion of a combiner/divider of the first waveguide feed network or the second waveguide feed network.

In some examples, the dual-polarized antenna array may include a plurality of first plates comprising upper and lower plates of the plurality of parallel plate polarizers, each of the plurality of first plates having slots along a first edge. The dual-polarized antenna array may also include a plurality of second plates, each of the plurality of second plates comprising stepped septums from a plurality of rows of the plurality of parallel plate polarizers, and each of the plurality of second plates inserted into the slots of the plurality of first plates.

In some examples of the dual-polarized antenna array, the parallel plate polarizer is constructed using an additive manufacturing technique.

In some examples of the dual-polarized antenna array, the first polarization is a first circular polarization and the second polarization is a second circular polarization. In other examples, the first polarization is a first linear polarization and the second polarization is a second linear polarization.

Some examples of the dual-polarized antenna array include a plurality of dielectric inserts located at least partially in a transition region of the plurality of stepped septums. In some examples, a transition region for each of the stepped septums has a length in an axial dimension orthogonal to a plane of an aperture of the dual-polarized antenna array that is less than a wavelength of a carrier frequency for the dual-polarized antenna array.

In some examples of the dual-polarized antenna array, a first divided waveguide of the plurality of first divided waveguides shares a first stepped septum of the plurality of stepped septums with a second divided waveguide of the plurality of second divided waveguides and shares a second stepped septum of the plurality of stepped septums with a third divided waveguide of the plurality of second divided waveguides, wherein the first divided waveguide is adjacent to the second divided waveguide and the third divided waveguide.

In some examples of the dual-polarized antenna array, the first set of stepped septums and the second set of stepped septums are interleaved along a direction parallel to the upper plate and the lower plate.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

DETAILED DESCRIPTION

Figure 1:
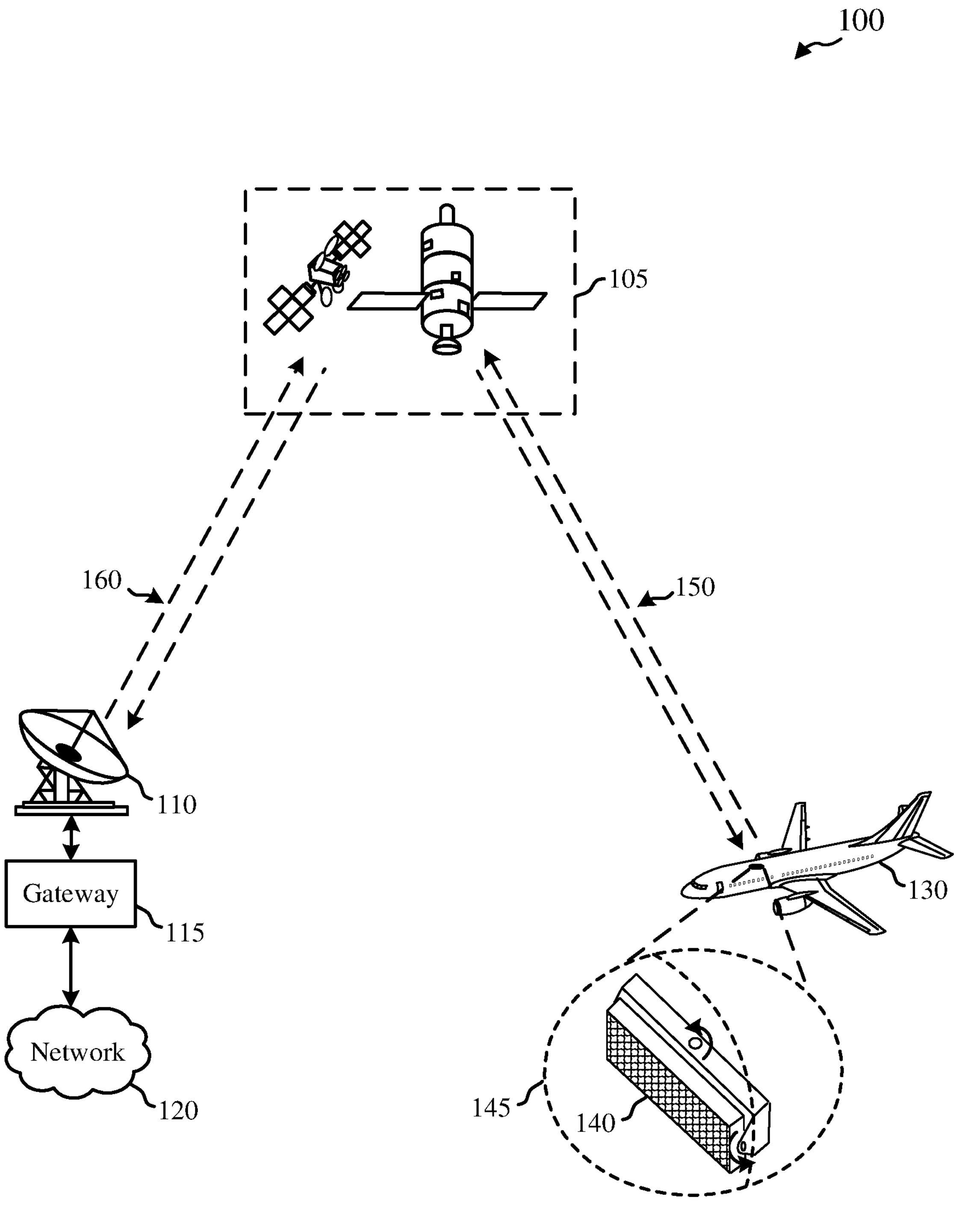
FIG. 1 shows a diagram of a wireless communication system in accordance with various embodiments.

Dual-polarized antenna arrays described herein may include one or more parallel plate polarizer linear arrays. Each parallel plate polarizer linear array may include alternately oriented septums arranged along a first dimension between a lower plate and an upper plate. The septums may include a first set of septums and a second set of septums extending between the upper and lower plates, where the second set of septums are inverted by 180 degrees relative to the first set of septums. In some examples, each septum may be partially dielectric loaded using dielectric inserts. The septums may have a first edge that is towards one of the lower or upper plates that is longer than a second edge that is towards the other of the lower or upper plates. Although referred to in the description as stepped septums for clarity, it should be understood that the septums may have a leading edge that is sloped or curved without deviating from the description.

The first set of septums may be interleaved with the second set of septums in an alternating fashion along the first dimension. This arrangement may be such that a septum of the first set of septums is between a pair of adjacent septums of the second set of septums and a septum of the second set is between a pair of adjacent septums of the first set of septums, excluding the septums at the ends of the linear array.

In some examples, the parallel plate polarizer linear array may be a direct radiating array. In other examples, the parallel plate polarizer linear array may be used in conjunction with a focusing aperture (e.g., a lens, a reflector, a close-out, etc.).

In some embodiments, multiple parallel plate polarizer linear arrays may be stacked (e.g., in a staggered or an aligned fashion) along a second dimension to define a two-dimensional array.

Each parallel plate polarizer linear array may include a dual-polarized parallel plate common waveguide region that is divided by septums to form first divided waveguides associated with a first polarization and second divided waveguides associated with a second polarization. Each septum may divide a portion of the parallel plate common waveguide region into a first divided waveguide associated with the first polarization and a second divided waveguide associated with the second polarization. The orientation of the septum determines which divided waveguides are associated with the first and second polarizations. In particular, a septum of the first set of septums will produce a first arrangement of divided waveguides (e.g., a first divided waveguide on the left and a second divided waveguide on the right), while a septum of the second set (e.g., inverted from one of the first set) will produce a second, opposite arrangement of divided waveguides (e.g., a first divided waveguide on the right and a second divided waveguide on the left). Thus, due to the alternately oriented arrangement of the septums, each septum may "share" its first divided waveguide with one of its adjacent, oppositely oriented septums, and may "share" its second divided waveguide with the other of its adjacent, oppositely oriented septums (excluding the ends of the linear array). As a result, adjacent septums (one of the first set and one of the second set) collectively operate as a polarizer for each individual divided waveguide.

Each divided waveguide may correspond with at least one mode (associated with its corresponding polarization in a far-field region) in the parallel plate common waveguide region, and thus the parallel plate common waveguide region operates with plural modes. In some examples, more than two modes may be in the common waveguide for broadband implementations. Two dominate modes in the common waveguide may have different field structures, wave velocities, and impedances. Design features described herein may be included to minimize undesired modes in the common waveguide.

Examples of the parallel plate polarizer linear array can also be described as a physical 1:N transition device, where N is greater than two (N>2) and N represents the number of individual divided waveguides. The device may have a single physical port that operates as two electrical ports since the common waveguide supports two orthogonal polarizations. By appropriate design of the septum walls (e.g., the plural counterposed central plates in the septum transition region), in examples using circular polarization, a $TE_{10}$ mode in each divided waveguide can couple approximately half of its power to each of the linear polarization components in the common waveguide.

In some examples, an antenna formed from the parallel plate polarizer linear arrays may be a passive array and include a waveguide feed network of combiner/dividers. The waveguide network may be coupled between the first divided waveguides of the parallel plate polarizer linear arrays and a first common port associated with the first polarization, and coupled between the second divided waveguides of the parallel plate polarizer linear arrays and a second common port associated with the second polarization. In other examples, the antenna is may be an active array and include components such as amplifiers and phase shifters on printed circuit boards coupled to the first and second divided waveguides. The antenna can further include combiner/divider boards to couple the printed circuit boards to a first common port associated with the first polarization and to a second common port associated with the second polarization.

Some examples of the dual-polarized antenna arrays described herein may be digital. A digital antenna may further include digital beamforming circuitry such as digital phase shifters or amplifiers, and may have analog-to-digital converters (ADCs) coupled with feed elements in the first and second divided waveguides. In examples in which the antenna is used for transmissions, digital signals representing one or more beams may be provided from a processing unit (e.g., a processor executing instructions stored in memory) or digital beamforming circuitry to digital-to-analog converters (DACs) coupled with the feed elements in the first and second divided waveguides. The DACs may convert the digital signals to analog signals that are provided to upconverters and amplifiers. The resultant upconverted and amplified signals may then be provided to the first and second divided waveguides (e.g., via feed elements) and subsequently transmitted by the stacked parallel plate polarizer linear arrays to form the transmitted beams. In examples in which the antenna is used for reception, analog signals from the first and second divided waveguides may be amplified, down converted, and provided to the ADCs. The ADCs may convert the analog signals to digital signals that are then provided to the processing unit to form one or more beams using digital beamforming techniques.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Example aspects of the disclosure are described in the context of devices and antenna subsystems. Aspects of the disclosure are further illustrated by and described with reference to apparatus diagrams, system diagrams, and flowcharts that relate to dual-polarized antenna arrays.

FIG. 1 shows a diagram of a satellite communication system 100 in accordance with various embodiments. The satellite communication system 100 includes a satellite system 105, a gateway 115, a gateway antenna system 110, and an aircraft 130. The gateway 115 communicates with one or more networks 120. In operation, the satellite communication system 100 provides for two-way communications between the aircraft 130 and the network 120 through the satellite system 105 and the gateway 115.

The satellite system 105 may include one or more satellites. The one or more satellites in the satellite system 105 may include any suitable type of communication satellite. In some examples, some or all of the satellites may be in geosynchronous orbits. In other examples, any appropriate orbit (e.g., low earth orbit (LEO), etc.) for satellite system 105 may be used. Some or all of the satellites of satellite system 105 may be multi-beam satellites configured to provide service for multiple service beam coverage areas in a predefined geographical service area.

The gateway antenna system 110 may be two-way capable and designed with adequate transmit power and receive sensitivity to communicate reliably with the satellite system 105. The satellite system 105 may communicate with the gateway antenna system 110 by sending and receiving signals through one or more beams 160. The gateway 115 sends and receives signals to and from the satellite system 105 using the gateway antenna system 110. The gateway 115 is connected to the one or more networks 120. The networks 120 may include a local area network (LAN), metropolitan area network (MAN), wide area network (WAN), or any other suitable public or private network and may be connected to other communications networks such as the Internet, telephony networks (e.g., Public Switched Telephone Network (PSTN), etc.), and the like.

The aircraft 130 includes an on-board communication system including a dual-polarized antenna array 140 (also referred to herein as "antenna array 140"). The aircraft 130 may use the antenna array 140 to communicate with the satellite system 105 over one or more beams 150. The antenna array 140 may be mounted on the outside of the fuselage of aircraft 130 under a radome 145. The antenna array 140 may be mounted to an elevation and azimuth gimbal which points the antenna array 140 (e.g., actively tracking) at a satellite of satellite system 105. The depth of the antenna array 140 may directly impact the size of the radome 145, for which a low profile may be desired. In other examples, other types of housings are used with the antenna array 140. The antenna array 140 may operate in the International Telecommunications Union (ITU) Ku, K, or Ka-bands, for example from 17.7 to 21.2 Giga-Hertz (GHz). In some examples, the antenna array 140 have partial dielectric inserts and may be used in a full 3.5 GHz band. Alternatively, the antenna array 140 may operate in other frequency bands such as C-band, X-band, S-band, L-band, and the like. Additionally, the antenna array 140 may be used in other applications besides onboard the aircraft 130, such as onboard boats, vehicles, or on ground-based stationary systems.

Figure 2:
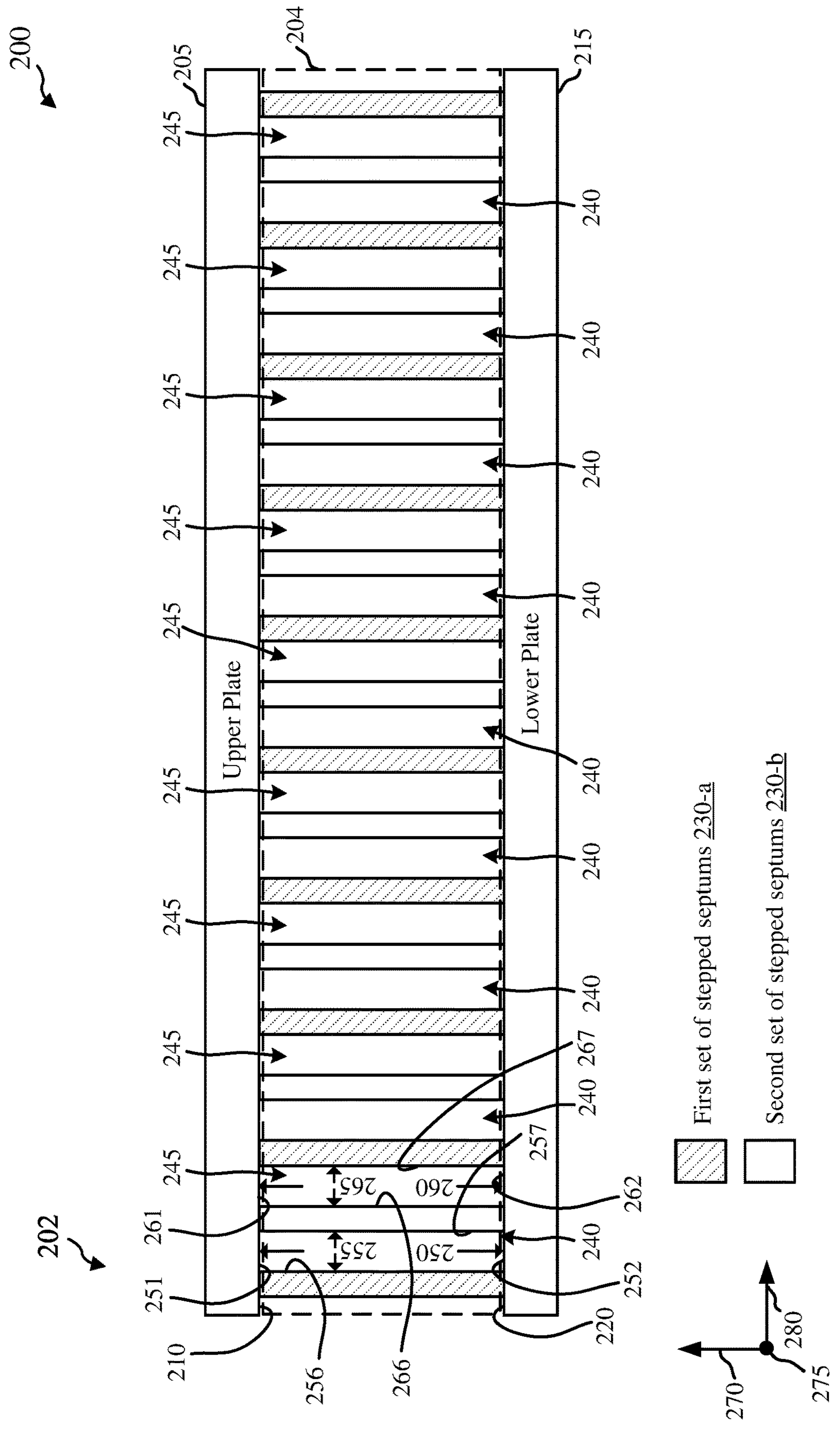
FIG. 2 illustrates a conceptual diagram of a waveguide device for a dual-polarized antenna array in accordance with various embodiments.

FIG. 2 illustrates a conceptual diagram of a waveguide device 200 for a dual-polarized antenna array in accordance with various embodiments. The waveguide device 200 may be an example of a component of the dual-polarized antenna array 140 of FIG. 1. The waveguide device 200 may be part of an antenna array installed onboard an aircraft, such as aircraft 130 of FIG. 1, or may be used with other devices or systems. In some examples, the elements of waveguide device 200 may be arrayed in a rectangular or square antenna array, although the elements or arrays of elements may have other shapes or configurations.

FIG. 2 illustrates the waveguide device 200 as separate components in order to discuss the functionality of each section separately. For example, the waveguide device 200 may illustrate waveguide propagation paths where electromagnetic waves can propagate through and be directed between various waveguide sections, based on the structure of the waveguide device 200. The waveguide device 200 in FIG. 2 shows front view of a row of the waveguide device 200 and, for illustrative purposes, does not show any additional structure behind. The waveguide device 200 may include multiple waveguide combiner/divider networks associated with different polarizations. Half of the networks may correspond to radiation having one polarization (e.g., right-hand circular polarization) and the other half of the networks may correspond to radiation having another polarization (e.g., left-hand circular polarization).

The waveguide device 200 illustrates one row of a parallel plate polarizer 202 of a dual-polarized antenna array, including an upper plate 205 and a lower plate 215. The upper plate 205 includes a first surface 210 that faces the lower plate 215. The lower plate 215 includes a second surface 220 that faces the upper plate 205. The upper plate 205 may be parallel, or approximately parallel, to the lower plate 215.

The waveguide device 200 may include a plurality of stepped septums, including a first set of stepped septums 230-*a* and a second set of stepped septums 230-*b* (collectively referred to herein as stepped septums 230). The stepped septums 230 may have a stepped structure on one edge and a flat structure on an opposite edge, which is illustrated at least in FIGS. 3A and 3B. The stepped structure of the stepped septums 230 may be referred to as the leading edge because it faces the aperture of the antenna array, while the flat structure may be referred to as the trailing edge because it faces away from the aperture. The stepped septums 230 extend from the first surface 210 of the upper plate 205 to the second surface 220 of the lower plate 215. Each of the stepped septums 230 includes a first side surface and a second side surface. The first set of stepped septums 230-*a* are inverted along a dimension (e.g., Y-axis 270) relative to the second set of stepped septums 230-*b*.

Between each pair of stepped septums 230 is formed a divided waveguide. The waveguide device 200 includes a plurality of first divided waveguides 240 associated with a first polarization, each of the plurality of first divided waveguides having a first set of opposing walls 250 formed by a first portion 251 of the first surface 210 of the upper plate 205 and a first portion 252 of the second surface 220 of the lower plate 215 and a second set of opposing walls 255 formed by a portion of the first side surface 256 of one of the first set of stepped septums 230-*a* and a portion of the first side surface 257 of one of the second set of stepped septums 230-*b*. The first side surfaces 256 and 257 may correspond to a same side of a stepped septum relative to the steps (e.g., the first side surfaces 256 and 257 may both be on the left side of a stepped septum when viewed from a front of a septum having the transition region of the septum increasing in height in a direction away from the viewer, or steps going up). The first portion of the first surface 210 of the upper plate 205 may be that portion of the first surface 210 that is between the stepped septums forming the particular first divided waveguide of the plurality of first divided waveguide 240. Likewise, the first portion of the second surface 220 of the lower plate 215 may be that portion of the second surface 220 that is between the stepped septums forming the particular first divided waveguide of the plurality of first divided waveguide 240.

The waveguide device 200 also includes a plurality of second divided waveguides 245 associated with a second polarization, each of the plurality of second divided waveguides 245 having a first set of opposing walls 260 formed by a second portion 261 of the first surface 210 of the upper plate 205 and a second portion 262 of the second surface 220 of the lower plate 215 and a second set of opposing walls 265 formed by a portion of the second side surface 266 of one of the first set of stepped septums 230-*a* and a portion of the second side surface 267 of one of the second set of stepped septums 230-*b*. The second side surfaces 266 and 267 may correspond to a same side of a septum relative to the steps (e.g., the second side surfaces 266 and 267 may both be on the right side of a stepped septum when viewed from a front of a septum having the transition region of the septum increasing in height in a direction away from the viewer, or steps going up). The first portion of the first surface 210 of the upper plate 205 may be that portion of the first surface 210 that is between the stepped septums forming the particular first divided waveguide of the plurality of first divided waveguide 240. Likewise, the first portion of the second surface 220 of the lower plate 215 may be that portion of the second surface 220 that is between the stepped septums forming the particular first divided waveguide of the plurality of first divided waveguide 240.

The first set of stepped septums 230-*a* may be interleaved with the second set of stepped septums 230-*b* in an alternating fashion along the first dimension (e.g., along "x" axis 280). This arrangement may be such that a stepped septum of the first set of stepped septums 230-*a* may be between a pair of adjacent stepped septums of the second set of stepped septums 230-*b* and a stepped septum of the second set of stepped septums 230-*b* is between a pair of adjacent stepped septums of the first set of stepped septums 230-*a*, excluding the stepped septums at the ends of the row of the parallel plate polarizer 202. In some examples, there may be a wall connecting each outside edge of the upper plate 205 and the lower plate 215.

In some examples of the waveguide device 200, a focusing aperture may be coupled with the row of the parallel plate polarizer 202. Examples of a focusing aperture may include a lens, a reflector, a radiating aperture, a radiating element, or the like. While any focusing aperture may be described herein as radiating electromagnetic radiation, they may also receive electromagnetic radiation. One or more focusing apertures may each be coupled with one of the linear arrays. The focusing aperture may be horns or waveguide apertures, for example. In examples where the focusing aperture are horns, the horns may be square, circular, or any other shape allowing reception and transmission of any desired polarized electromagnetic signal. The focusing apertures may also be loaded with dielectric bodies.

The waveguide device 200 may have waveguide propagation paths generally aligned along z-axis 275 (e.g., out of the page). The first divided waveguides 240 and the second divided waveguides 245 may also be referred to herein as "waveguide ports."

The stepped septums 230 may combine and separate polarization for transmission and reception. The stepped septums 230 may be described herein as septum polarizers, although described aspects may be applied with other types of polarization duplexers. The conducting surfaces of the stepped septums 230 may be formed using a conductive material such as metal, or may be metal-plated. The stepped septums 230 may be designed to generate linear or circular polarization. In one example, the stepped septums 230 have a metallic staircase design that generates right-handed circular polarization (RHCP) and left-handed circular polarization (LHCP) for radiation.

In some examples, each element of the parallel plate polarizer 202 may include an element that is asymmetric to one or more modes of signal propagation. For example, the parallel plate polarizer 202 may include a stepped septum 230 configured to be symmetric to the $TE_{10}$ mode (e.g., component signals with their E-field along Y-axis 270 in an individual waveguide) while being asymmetric to the $TE_{01}$ mode (e.g., component signals with their E-field along X-axis 280 in the common port 204). The stepped septum 230 may facilitate rotation of the $TE_{01}$ mode without changing signal amplitude, which may result in addition and cancellation of the $TE_{01}$ mode with the $TE_{10}$ mode on opposite sides of the stepped septum 230. From the dividing perspective (e.g., a received signal propagating in the common port 204 in a negative direction along Z-axis 275), the $TE_{01}$ mode may additively combine with the $TE_{10}$ mode for a signal having RHCP on the side of the stepped septum 230 coupled with a first divided waveguide 240, while cancelling on the side of the stepped septum 230 coupled with the second divided waveguide 245. Conversely, for a signal having LHCP, the $TE_{01}$ mode and $TE_{10}$ mode may additively combine on the side of the stepped septum 230 coupled with the second divided waveguide 245 and cancel each other on the side of the stepped septum 230 coupled with the first divided waveguide 240. Thus, the first and second divided waveguides 240, 245 may be excited by orthogonal basis polarizations of polarized waves incident on the common port 204, and may be isolated from each other. In a transmission mode, excitations of the first and second divided waveguides 240, 245 (e.g., $TE_{10}$ mode signals) may result in corresponding RHCP and LHCP waves, respectively, emitted from the common port 204.

The polarizer may be used to transmit or receive waves having a combined polarization (e.g., linearly polarized signals having a desired polarization tilt angle) at the individual waveguide by changing the relative phase of component signals transmitted or received via the first and second divided waveguides 240, 245. For example, two equal-amplitude components of a signal may be suitably phase shifted and sent separately to the first divided waveguide 240 and the second divided waveguide 245, where they are converted to an RHCP wave and an LHCP wave at the respective phases by the stepped septum 230. When emitted from the common port 204, the LHCP and RHCP waves combine to produce a linearly polarized wave having an orientation at a tilt angle related to the phase shift introduced into the two components of the transmitted signal. The transmitted wave is therefore linearly polarized and can be aligned with a polarization axis of a communication system. Similarly, a wave having a combined polarization (e.g., linear polarization) incident on common port 204 may be split into component signals of the basis polarizations at the divided waveguides 240, 245 by stepped septums 230 and recovered by suitable phase shifting of the component signals in a receiver. Although discussed as using a stepped septum polarizer, other types of polarizers may be used including sloped septum polarizers or other polarizers.

The stepped septums 230 may have a transition region (e.g., stepped region) between the common port 204 and the divided waveguides 240 and 245. In some examples, the stepped septums 230 may receive two signals corresponding to two different polarizations via the divided waveguides 240 and 245 and combine the signals in the common port 204 for transmission. The stepped septums 230 may also generate different polarizations for a dual-polarized antenna array. For example, a first signal excited at a first divided waveguide port 240 may result in a first circular polarization (e.g., LHCP) at the common port 204. A second signal excited at a second divided waveguide port 245 may result in a second circular polarization (e.g., RHCP) at the common port 204. Similarly, a circularly polarized wave having the first polarization exciting the common port 204 may be translated to a signal at the first divided waveguide ports 240. That is, the energy from a wave having the first circular polarization that is received at the common port 204 will be transferred to the first divided waveguide ports 240. Similarly, energy from a circularly polarized wave having the second polarization exciting the common port 204 will be translated to a signal at the second divided waveguide ports 245. In some instances, the stepped septums 230 may operate in a transmission mode for a first polarization (e.g., LHCP) while operating in a reception mode for a second polarization (e.g., RHCP).

Although the illustrated septums are designed to natively convert between excitations in the divided waveguide ports and circular polarization, in some cases the septums may be modified to natively convert between excitations in the divided waveguide ports and linear polarization. For example, a longer septum (e.g., having a longer transition region of steps), or having multiple step reversals in the axial dimension of the antenna (e.g., the Z-axis 275), the polarizer may allow the first and second divided waveguides 240, 245 to be excited by orthogonal linear basis polarizations of polarized waves incident on the common port 204, with sufficient port isolation between the first and second divided waveguides 240, 245. In such cases, the septum polarizer becomes a septum orthomode transducer (OMT).

The stepped septums 230 may be divided into two sets-a first set of stepped septums 230-*a* and a second set of stepped septums 230-*b*. The first set of stepped septums 230-*a* may have a first orientation in the waveguide device 200 and the second set of stepped septum 230-*b* may have a second orientation in the waveguide device 200. The second orientation may be opposite, or inverted, from the first orientation (e.g., along Y-axis 270). The first set of stepped septums 230-*a* and the second sets of stepped septum 230-*b* may be arranged into separate and alternating rows of the waveguide device 200, where FIG. 2 illustrates one row of the waveguide device 200. In examples where the waveguide device 200 includes stacked rows, the first set of stepped septums 230-*a* may be aligned with each other or offset. For example, for aligned stepped septums 230-*a*, the waveguide device 200 may include a first column having stepped septum 230-*a*, an adjacent second column having stepped septums 230-*b*, a third column adjacent to the second column having stepped septum 230-*a*, and so on.

Some examples of the waveguide device 200 may include a plurality of antenna feeds within respective waveguides of the plurality of first divided waveguides 240 and the plurality of second divided waveguides 245. In some examples, the waveguide device 200 may include a first waveguide feed network coupled between a first feed port and the plurality of first divided waveguides 240 and a second waveguide feed network coupled between a second feed port and the plurality of second divided waveguides 245. These components are illustrated in later Figures.

The components of the waveguide device 200 described with respect to FIG. 2 illustrates the compact, planar shape of the waveguide feed network of the waveguide device 200. Notably, the common port 204 may be shared among multiple stepped septums 230. That is, no wall of a common port may separatee the stepped septums 230 from each other. Some of the Figures below describe specific structural examples of possible components of a waveguide device or antenna array.

Figure 3A:
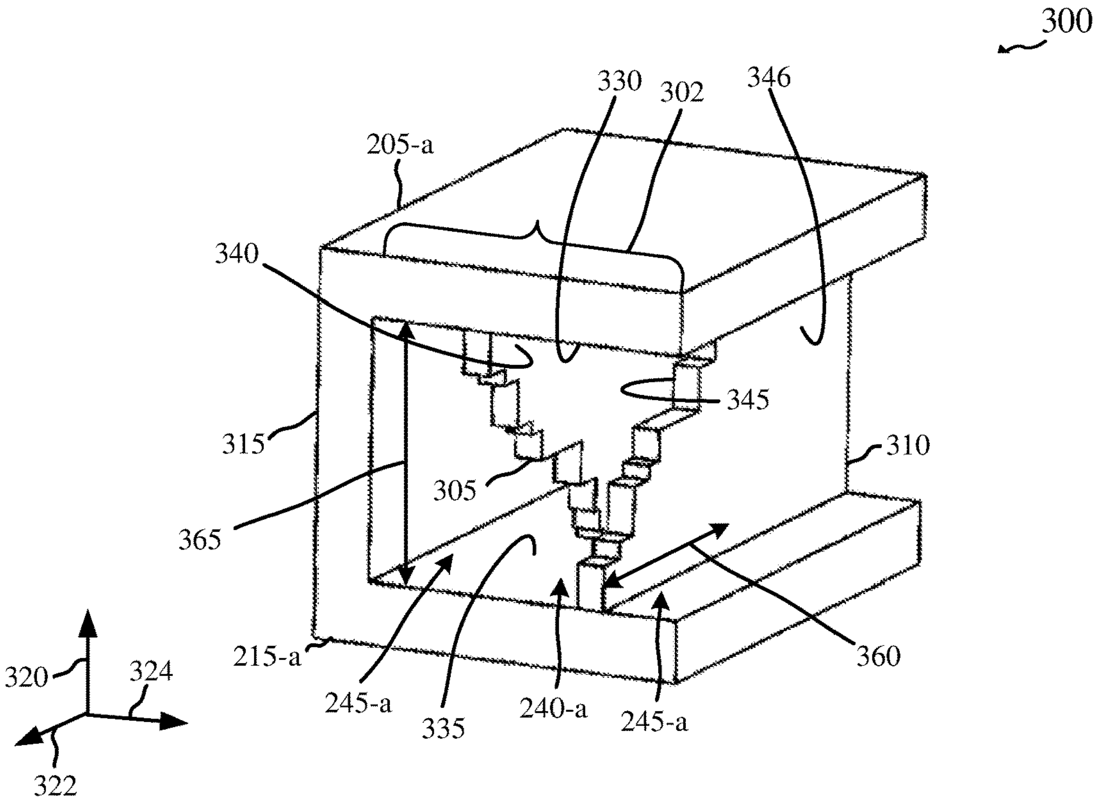
FIGS. 3A and 3B illustrate examples of a single element of a linear array for a dual-polarized antenna array in accordance with aspects of the present disclosure.

FIG. 3A illustrates an example of a single element 302 of a linear array 300 for a dual-polarized antenna array in accordance with aspects of the present disclosure. The linear array 300 may be part of a row of a parallel plate polarizer. The linear array 300 may be included in a waveguide device, such as the waveguide device 200 of FIG. 2, or a component of the dual-polarized antenna array 140 of FIG. 1. The linear array 300 may be part of an antenna array installed onboard an aircraft, such as aircraft 130 of FIG. 1, or may be used with other devices or systems. In some examples, the element of the linear array 300 may be arranged linearly into a longer linear array, although the elements or arrays of elements may have other shapes or configurations.

The linear array 300 may include an upper plate 205-*a*, which may be an example of the upper plate 205 of FIG. 2. The linear array 300 may also include a lower plate 215-*a*, which may be an example of the lower plate 215 of FIG. 2. FIG. 3A illustrates an example of an end of the linear array 300, which includes a wall 315. The element 302 of the linear array 300 may include a first stepped septum 305 and a second stepped septum 310. For example, the element 302 may be considered to include the portion of the linear array 300 from the middle of one of a second divided waveguide 245-*a* to the middle of an adjacent second divided waveguide 245-*a*. Alternatively, the element 302 may be considered to include the portion of the linear array 300 from one of the first set of stepped septums 305 to a next one of the first set of stepped septums 305. The element 302 of the linear array 300 illustrated in FIG. 3 may be repeated.

The first stepped septum 305 may be inverted compared to the second stepped septum 310. For example, the first stepped septum 305 is oriented 180 degrees with respect to the second stepped septum 310. As shown in FIG. 3A, the first stepped septum 305 may be oriented in a negative Y-axis 320 (e.g., the steps face in a direction of the negative Y-axis 320) and the second stepped septum 310 may be oriented in a positive Y-axis 320 (e.g., the steps face in a direction of the positive Y-axis 320).

The stepped septums 305 and 310 may have a stepped edge on a leading edge and a flat edge on the other side. The stepped edge may have regular or irregular sized steps. The edges of the steps may be square, rounded, oval, or the like. In some examples, the stepped septums 305 and 310 have matching steps. In other examples, stepped septums 305 and 310 may have different steps compared with each other. In other examples, the stepped septums 305 and 310 may be slanted or curved instead of stepped.

Between the first stepped septum 305 and the second stepped septum 310, a first divided waveguide 240-*a* may be formed. The first divided waveguide 240-*a* may be associated with a first polarization (e.g., LHCP). The first divided waveguide 240-*a* may include a first set of opposing walls formed by a first portion of the first surface 330 of the upper plate and a first portion of the second surface 335 of the lower plate and a second set of opposing walls formed by a portion of the first side surface 340 of the first stepped septum 305 and a portion of the first side surface 345 of the second stepped septum 310. The first side surfaces 340 and 345 may correspond to a same side of a stepped septum relative to the steps. As shown in FIG. 3A, the first side surfaces 340 and 345 may both be on the left side of a stepped septum when oriented as shown by stepped septum 310 (e.g., may be a side surface having a normal extending to the negative direction on the X-axis 324 when the steps are increasing in Y-axis 320 along transition region 360).

A second divided waveguide 245-*a* may be adjacent to the first divided waveguide 240-*a*, and formed between the stepped septum 310 and another stepped septum oriented like the stepped septum 305 on the other side of the stepped septum 310, if the linear array 300 were extended. The second divided waveguide 245-*a* may be associated with a second polarization (e.g., RHCP) different from the first polarization. The second divided waveguide 245-*a* may include a first set of opposing walls formed by a second portion of the first surface 330 of the upper plate and a second portion of the second surface 335 of the lower plate and a second set of opposing walls formed by a portion of the second side surface 346 of the second stepped septum 310 and a portion of the second side surface of an adjacent first stepped septum (not shown). The second side surfaces 346 may correspond to a same side of a stepped septum relative to the steps. As shown in FIG. 3A, the second side surfaces 346 may both be on the right side of a stepped septum when oriented as shown by stepped septum 310 (e.g., may be a side surface having a normal extending to the positive direction on the X-axis 324 when the steps are increasing in Y-axis 320 along transition region 360).

Each of the stepped septums 305 and 310 may have a leading edge that is located at an aperture plane defined by the leading edges of the upper plate 205-*a* and the lower plate 215-*a*, as shown in FIG. 3A. Alternatively, the leading edge may be close to the aperture, but not co-planar with the aperture. For example, the stepped septums 305 and 310 may be closer to the aperture than a quarter wavelength of the frequency of the antenna array. In other examples, the leading edges of stepped septums 305 and 310 may be located at different distances to the aperture, including extending beyond the aperture as described in more detail below.

In some examples, the length of a transition region 360 of the stepped septums 305 and 310 may be longer than a dimension 365 of the common waveguide (e.g., the distance from the upper plate 205-*a* to the lower plate 215-*a*). In other examples, the length of the transition region 360 of the stepped septums 305 and 310 may be less than the dimension 365 of the common waveguide. For example, the length of transition region 360 may be less than ¾ or less than ½ of the dimension 365 of the common waveguide. In other examples, other comparative dimensions may be used.

The designs described herein enable the antenna array to be smaller in various dimensions than conventional antenna arrays for use with the same frequencies. This may reduce the thickness (e.g., the axial length of the assembly along the Z-axis 322), which saves on the overall mass for the antenna array. Additionally, or alternatively, by omitting internal walls to define individual common waveguides for each septum polarizer, the antenna array may be smaller along the X-axis 324. Furthermore, the techniques described herein provide an arrangement of waveguides that is identical and regular, which improves simplicity for attaching back-end assembly components, such as waveguide feed networks and circuit boards, to the waveguides.

Some examples provide a rectangular organization of interfaces that can be used in a number of different beam-forming ways. For example, a waveguide power divider network may be used with the antenna array. In other examples, conventional waveguide designs may be used with the regular waveguides. Furthermore, the regular waveguides may be compatible with printed circuit boards. For example, active components (e.g., circuit cards) may be located directly behind the radiators. These active components may include low noise amplifiers, high power amplifiers, and transmit amplifiers. Phased control devices that can be used to steer a beam over a range of angles may be used. The active components may also be used to line up or to co-phase the apertures.

Figure 3B:
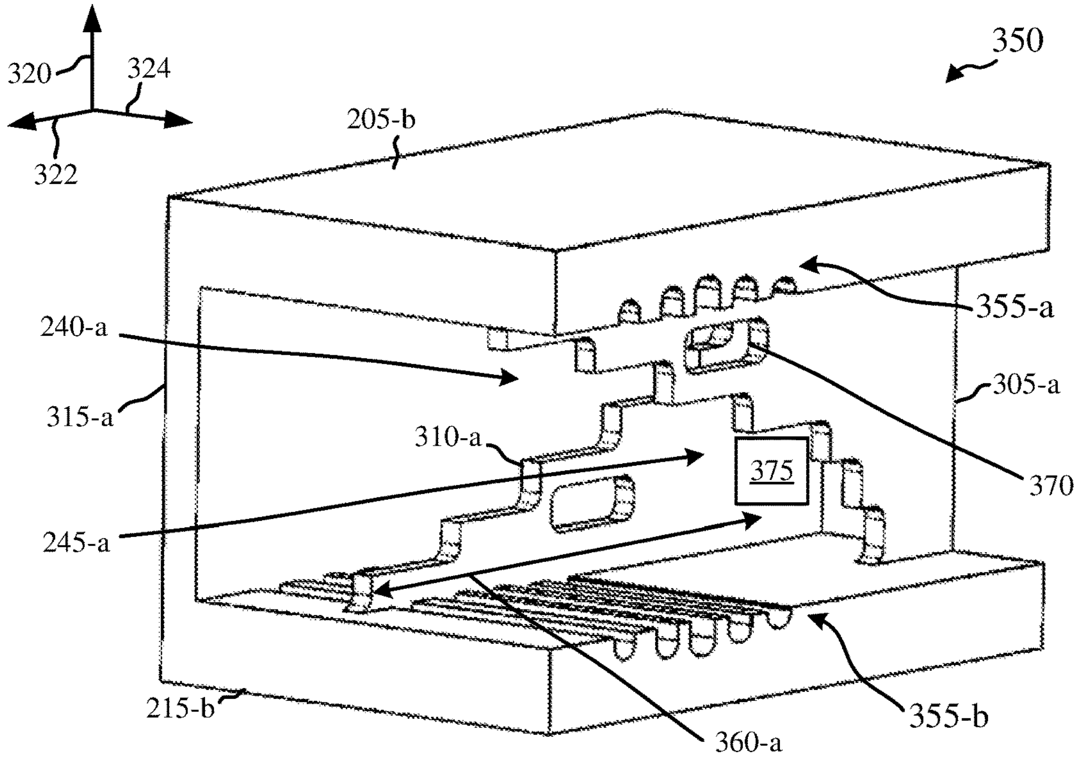

FIG. 3B illustrates another example of a single element of linear array 350 for a dual-polarized antenna array in accordance with aspects of the present disclosure. The linear array 300 may be part of a row of a parallel plate polarizer. The linear array 350 may be included in a waveguide device, such as the waveguide device 200 of FIG. 2, or a component of the dual-polarized antenna array 140 of FIG. 1. The linear array 350 may be an example of the linear array 300 of FIG. 3A. The linear array 350 may be part of an antenna array installed onboard an aircraft, such as aircraft 130 of FIG. 1, or may be used with other devices or systems. In some examples, the element of the linear array 350 may be arranged linearly into a longer linear array, although the elements or arrays of elements may have other shapes or configurations.

The linear array 350 may include similar structures to that of the linear array 300, such as an upper plate 205-*b*, a lower plate 215-*b*, a wall 315-*a*, a first stepped septum 305-*a*, and a second stepped septum 310-*a*. Additionally, the upper plate may include one or more sidewall features 355-*a* and the lower plate may include one or more sidewall features 355-*b* (referred to herein as sidewall features 355). The sidewall features 355 may be configured to lower the waveguide cutoff frequency or alter the propagation constant (e.g., of the $TE_{10}$ mode), which may provide improved performance or design flexibility for an antenna array of stacked linear arrays 350. The sidewall features 355 may be located within a transition region 360-*a* of the stepped septums and be formed along multiple rows of linear arrays 350. Alternatively, one or more sidewall features 355 may be located towards the aperture from the transition region 360-*a*, or within the divided waveguides. In addition to recesses or grooves as shown in FIG. 3B, the sidewall features 355 may include protrusions into the waveguides. Although the cross-sections of the sidewall features shown are semi-circular, the recesses or protrusions may be of any shape (e.g., rectangular, square, triangular, trapezoidal, oval, elliptical, etc.) and may have different dimensions than shown in FIG. 3B.

The stepped septums 305-*a* and 310-*a* may also have cut-outs 370, which also may modify propagation of the modes of the antenna to improve properties (e.g., cutoff frequencies, axial ratio). In some examples, a plurality of dielectric inserts may be located at least partially in the transition region 360-*a* of the stepped septums 305-*a* and 310-*a*. A transition region 360-*a* may be a region of the stepped portion of a stepped septum that transitions from the septum being in contact with one plate and not the other and to being in contact with both plates. In some examples, a transition region 360-*a* for each of the stepped septums has a length in an axial dimension (e.g., Z axis 322) orthogonal to a plane of an aperture of the dual-polarized antenna array that is less than a wavelength of a carrier frequency for the dual-polarized antenna array. In some examples, a dielectric insert 375 may be inserted into the transition region 360-*a*. The dielectric insert 375 may at least partially fill divided waveguides 240-*a* and 245-*a* (e.g., may partially or fully extend between the opposing walls of the divided waveguides 240-*a* and 245-*a* along the X-axis 324 or the Y-axis 320), and may extend at least partially into transition region 360-*a* of the stepped septums 305-*a* and 310-*a*.

Figure 4A:
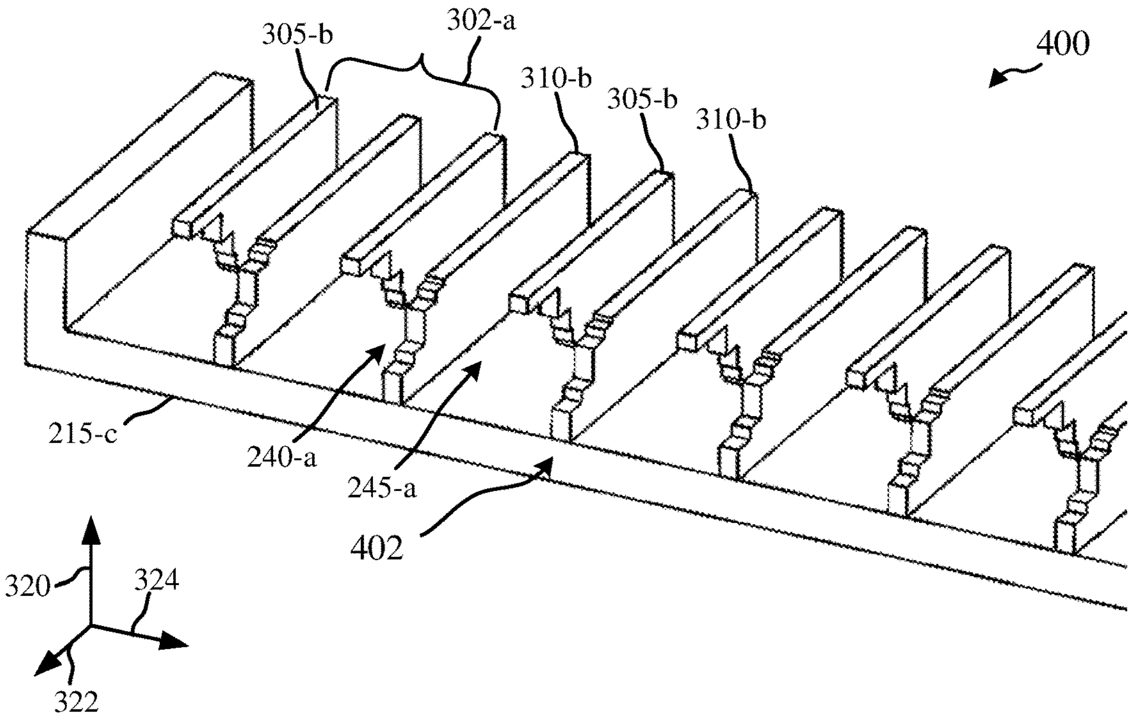
FIGS. 4A and 4B illustrate examples of a partial linear array for a dual-polarized antenna array in accordance with aspects of the present disclosure.

FIG. 4A illustrates an example of a partial linear array 400 for a dual-polarized antenna array in accordance with aspects of the present disclosure. The partial linear array 400 may be part of a row of a parallel plate polarizer. The partial linear array 400 may be included in a waveguide device, such as the waveguide device 200 of FIG. 2, or a component of the dual-polarized antenna array 140 of FIG. 1. The partial linear array 400 may include an element 302-*a* of a linear array, such as that shown in FIGS. 3A and 3B. The linear array 400 may be part of an antenna array installed onboard an aircraft, such as aircraft 130 of FIG. 1, or may be used with other devices or systems. In some examples, the partial linear array 400 may be arranged linearly into a longer linear array, although the elements or arrays of elements may have other shapes or configurations.

The partial linear array 400 includes a lower plate 215-*c*, which may be an example of the lower plate 215 of FIGS. 2, 3A, and 3B. The partial linear array 400 may also include an upper plate, however, the upper plate is not shown in FIGS. 4A through 4C to illustrate the interior structure of the partial linear arrays more clearly. FIG. 4A illustrates an example of an end of the partial linear array 400. The element of the partial linear array 400 may include a plurality of stepped septums 402, which may include a set of first stepped septums 305-*b* and a set of second stepped septums 310-*b*. The set of first stepped septum 305-*b* may be inverted compared to the set of second stepped septum 310-*b*. For example, the set of first stepped septums 305-*b* may be oriented 180 degrees along the Y-axis 320 with respect to the set of second stepped septums 310-*b*.

In some examples, a first divided waveguide of the plurality of first divided waveguides 240-*a* may share a first stepped septum 305-*b* of the plurality of stepped septums with a second divided waveguide of the plurality of second divided waveguides 245-*a* and may share a second stepped septum 310-*b* of the plurality of stepped septums with a third divided waveguide of the plurality of second divided waveguides 245-*a*, where the first divided waveguide is adjacent to the second divided waveguide and the third divided waveguide. Similarly, the second divided waveguide of the plurality of second divided waveguides 245-*a* may share a third stepped septum 310-*b* of the plurality of stepped septums with a fourth divided waveguide of the plurality of first divided waveguides 240-*a*, where the fourth divided waveguide is adjacent to the second divided waveguide.

Figure 4B:
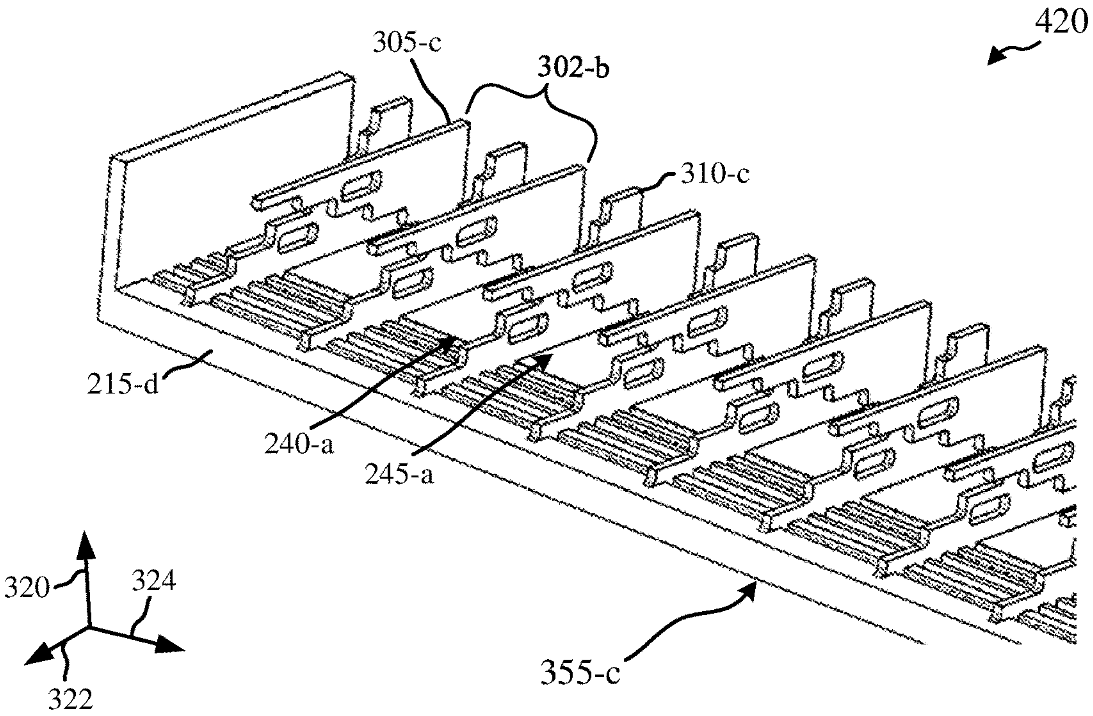

FIG. 4B illustrates another example of a partial linear array 420 for a dual-polarized antenna array in accordance with aspects of the present disclosure. The partial linear array 420 may be part of a row of a parallel plate polarizer. The partial linear array 420 may be included in a waveguide device, such as the waveguide device 200 of FIG. 2, or a component of the dual-polarized antenna array 140 of FIG. 1. The partial linear array 420 may include an element 302-*b* of a linear array, such as that shown in FIGS. 3A and 3B. The linear array 420 may be part of an antenna array installed onboard an aircraft, such as aircraft 130 of FIG. 1, or may be used with other devices or systems. In some examples, the partial linear array 420 may be arranged linearly into a longer linear array, although the elements or arrays of elements may have other shapes or configurations.

Like FIG. 4A, FIG. 4B shows the partial linear array 420 having a lower plate 215-*d* and no upper plate. FIG. 4B illustrates an example of the partial linear array 420 including sidewall features 355-*c* in the lower plate 215-*b*, such as in FIG. 3B. The partial linear array 420 may include a set of first stepped septums 305-*c* and a set of second stepped septums 310-*c*.

Figure 5A:
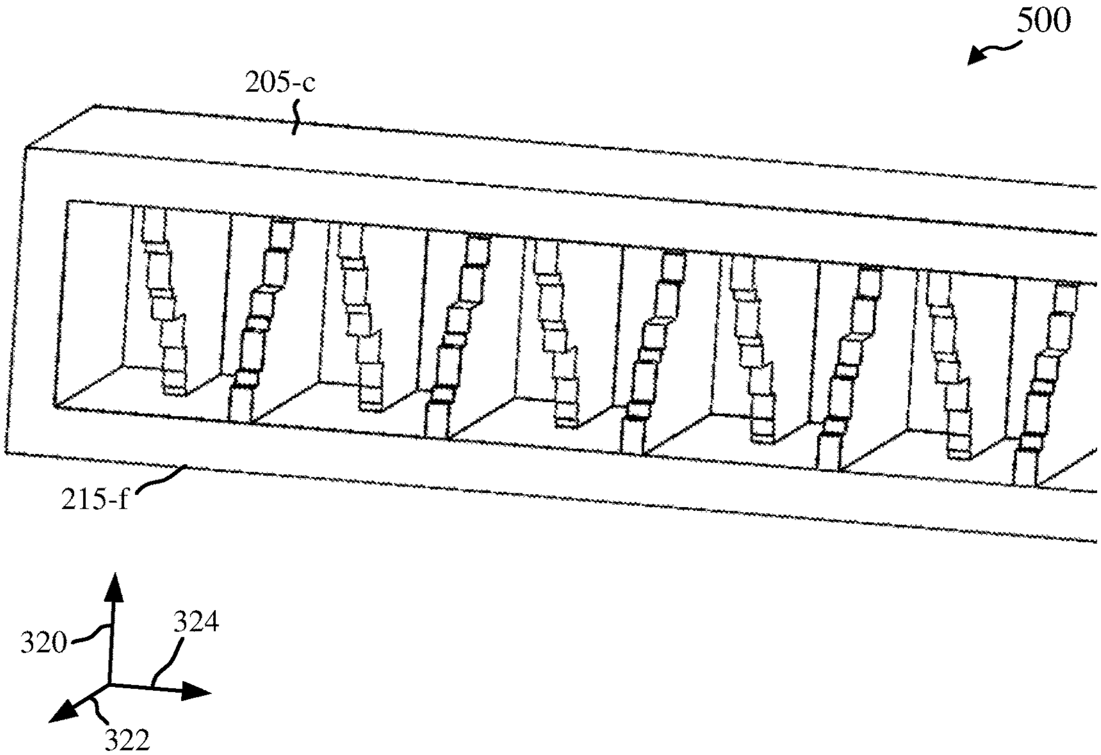
FIGS. 5A and 5B illustrate additional examples of a partial linear array for a dual-polarized antenna array in accordance with aspects of the present disclosure.

FIG. 5A illustrates an additional example of a partial linear array 500 for a dual-polarized antenna array in accordance with aspects of the present disclosure. The partial linear array 500 may be an example of the partial linear arrays 400, 420, and 440 of FIGS. 4A through 4C. The partial linear array 500 illustrates an upper plate 205-*c* in addition to the lower plate 215-*f*.

Figure 5B:
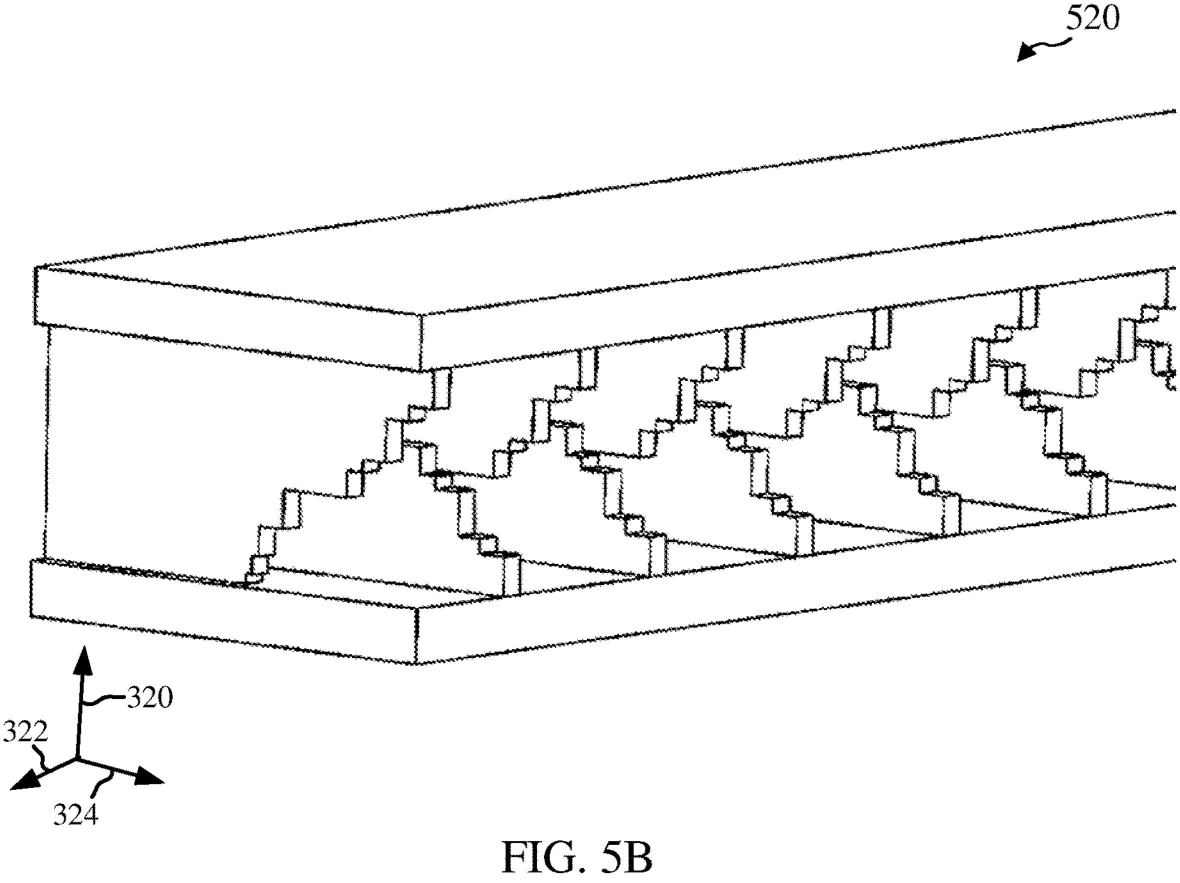

FIG. 5B illustrates an additional example of a partial linear array 520 for a dual-polarized antenna array in accordance with aspects of the present disclosure. The partial linear array 520 illustrates another view of a partial linear array without showing a wall at an end of the linear array for clarity.

The first set of stepped septums 305-*f* may have a transition region 360-*a*, which may have a same length as a corresponding transition region for the second set of stepped septums 310-*d*. As shown in FIG. 5C, the transition region may end (e.g., in a negative direction along Z-axis 322) at a point that is coplanar with the leading edges of the upper plate 205-*d* and lower plate 215-*g*. Alternatively, the transition region may end in front of (e.g., a location that is more positive along the Z-axis 322), or may end behind (e.g., a location that is more negative along the Z-axis 322). In some examples, the first set of stepped septums 305-*f* may have a length different from the second set of stepped septums 310-*f*.

In some examples, the partial linear array 540 may include a plurality of dielectric inserts located at least partially in a transition region of the plurality of stepped septums. The transition region for each of the stepped septums may have a length in an axial dimension orthogonal to a plane of an aperture of the dual-polarized antenna array that is less than a wavelength of a carrier frequency for the dual-polarized antenna array. In some examples, the length is less than a dimension of the partial linear array 540 between the upper plate 205-*d* and lower plate 215-*g* (e.g., a height of the divided waveguides along the Y-axis 320).

Figure 6:
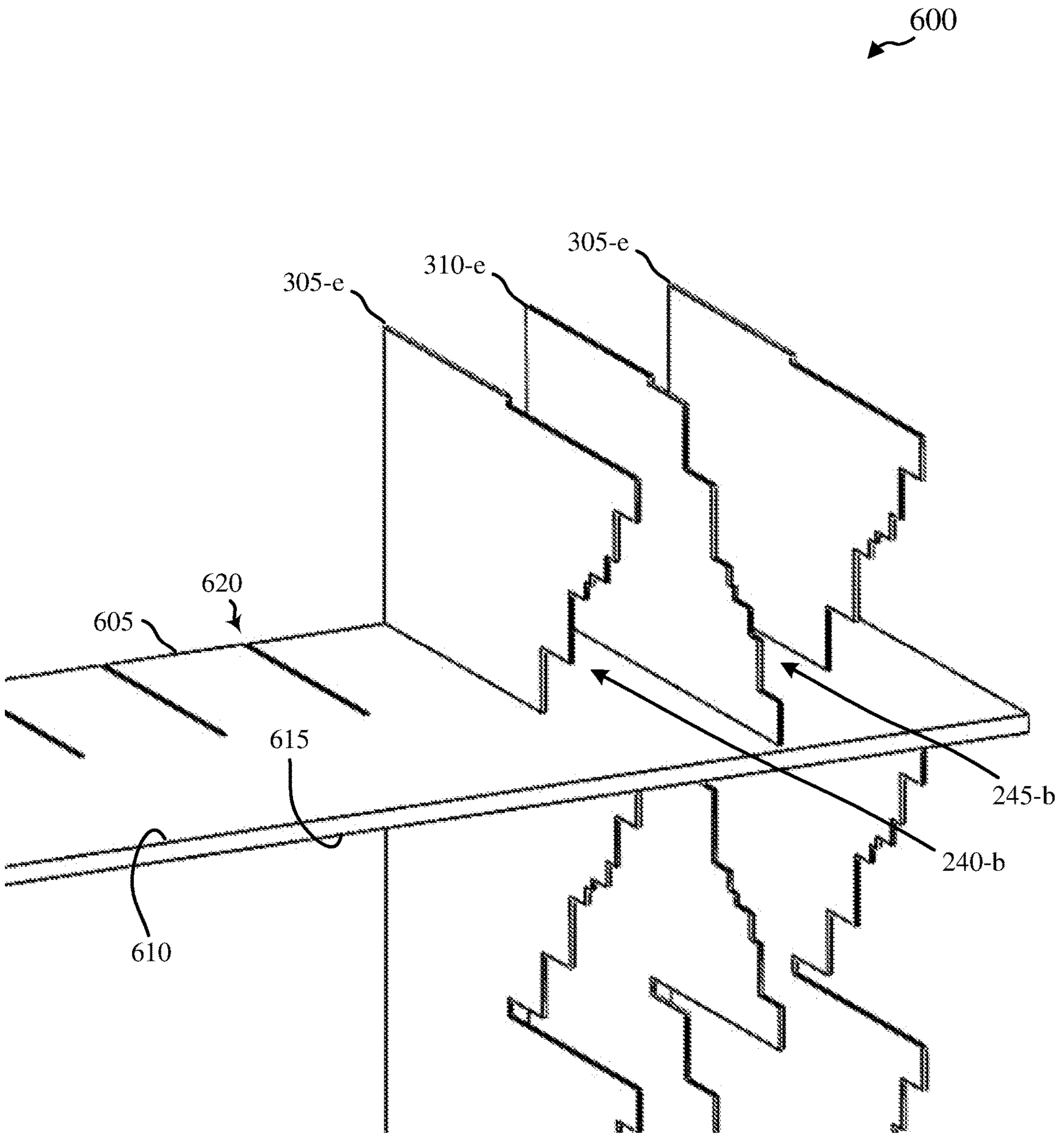
FIG. 6 illustrates an example stepped septum structure in accordance with aspects of the present disclosure.

FIG. 6 illustrates an example stepped septum structure 600 in accordance with aspects of the present disclosure. The stepped septum structure 600 may be part of a waveguide device as described herein, and FIG. 6 provides a partial view. The stepped septum structure 600 may include a first set of stepped septums 305-*e* and a second set of stepped septums 310-*e*. The first set of stepped septums 305-*e* and the second set of stepped septums 310-*e* may formed from a single sheet of material that includes multiple stepped sections for an equivalent number of rows of a linear array. The first set of stepped septums 305-*e* and the second set of stepped septums 310-*e* may be fitted into a plurality of slots 620 in a plate 605.

The plate 605 may include a first surface 610 and a second, opposite surface 615. FIG. 6 illustrates how the first surface 610 of the plate 605 may be part of a first linear array and the second surface 615 of the plate 605 may be part of a second linear array. The plate 605 may function as an upper plate for the first linear array and as a lower plate for the second linear array. The stepped septum structure 600 shows an example where the stepped septums are aligned between different rows of the linear arrays in an antenna array. In other examples, other configurations are used. For example, the plurality of stepped septums for one of the pair of adjacent parallel plate polarizers are aligned with the plurality of stepped septums for another one of the pair of adjacent parallel plate polarizers in a dimension parallel to the upper and lower plates of the first parallel plate polarizer.

The stepped septum structure 600 illustrates a plurality of parallel assemblies, wherein each parallel assembly comprises a stepped septum from each of the plurality of parallel plate polarizers. In some examples, the parallel plate polarizer is constructed using an additive manufacturing technique.

In some examples, the dual-polarized antenna array includes a plurality of first plates comprising upper and lower plates of the plurality of parallel plate polarizers, each of the plurality of first plates having slots along a first edge. The dual-polarized antenna array may also include a plurality of second plates, each of the plurality of second plates comprising stepped septums from a plurality of rows of the plurality of parallel plate polarizers, and each of the plurality of second plates inserted into the slots of the plurality of first plates. Each of the plurality of first and second plates may be formed in a single workpiece from metal (e.g., stamped sheet metal). The first and second plates may be fit together to form the dual-polarized antenna array.

As shown in FIG. 6, the parallel upper and lower plates may run horizontally, with the stepped septums may run vertically. This structure may form a plurality of first divided waveguides 240-*b* and a plurality of second divided waveguides 245-*b*. In passive array examples, one or more feed networks (not shown) may be coupled with the plurality of first divided waveguides 240-*b* and the plurality of second divided waveguides 245-*b*. In active array examples, a plurality of circuit cards may be included, wherein the circuit cards are perpendicular to the plane formed by the upper and lower plates and the stepped septums. The circuit cards may be coupled to the plurality of first divided waveguides 240-*b* and the plurality of second divided waveguides 245-*b*, which may be snapped in or otherwise fitted together.

The forming of the single workpiece for each column of stepped septums for the antenna array as illustrated here may save manufacturing costs and time, reduce the amount of material used to make the antenna array, and increase simplicity of the design.

Figure 7A:
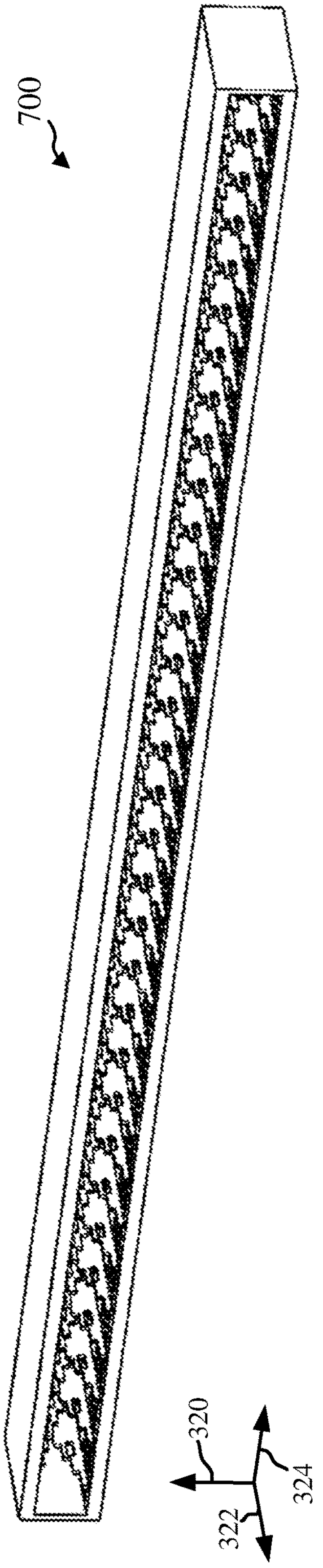
FIGS. 7A and 7B illustrate examples of a 32 element linear array for a dual-polarized antenna array in accordance with aspects of the present disclosure.

FIG. 7A illustrates an example of a 32 element linear array 700 for a dual-polarized antenna array in accordance with aspects of the present disclosure. The 32 element linear array 700 may be an example of part of a waveguide device as described herein, and may include one or more components of the linear arrays as described herein. The 32 element linear array 700 may include a plurality of stepped septums that are alternatively inverted. The 32 element linear array 700 may include sidewall features in the plates and/or cutouts in transition regions of the plurality of stepped septums. Copies of the 32 element linear array 700 may be stacked upon each other to form a larger antenna array. In some examples, copies of the 32 element linear array 700 are stacked but share plates between them. In some examples, dielectric inserts may be located in the cutouts of the plurality of stepped septums.

Figure 7B:
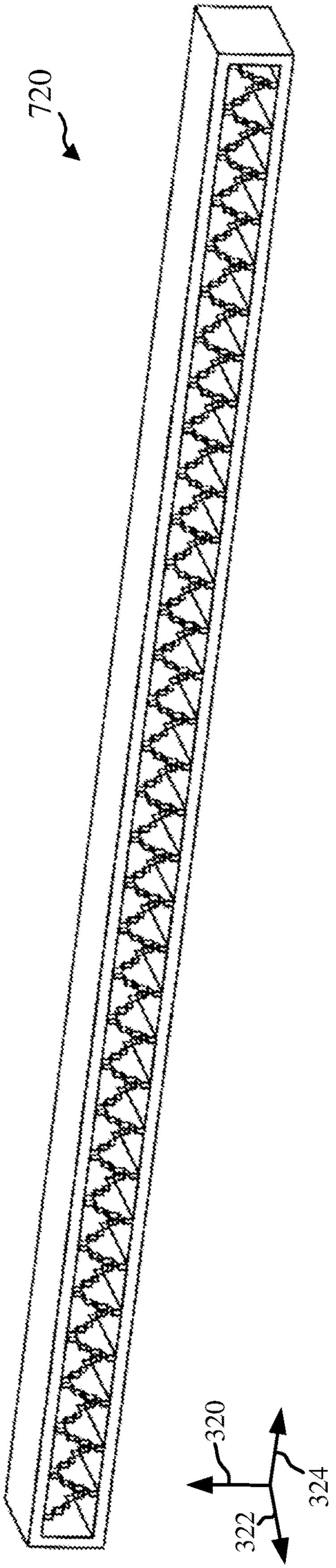

FIG. 7B illustrates another example of a 32 element linear array 720 for a dual-polarized antenna array in accordance with aspects of the present disclosure. The 32 element linear array 720 may be an example of part of a waveguide device as described herein, and may include one or more components of the linear arrays as described herein. The 32 element linear array 720 may include a plurality of stepped septums that are alternatively inverted (e.g., along the Y-axis 320). Copies of the 32 element linear array 720 may be stacked upon each other to form a larger antenna array. In some examples, copies of the 32 element linear array 720 are stacked but share plates between them. In the example of the 32 element linear array 720, the plurality of stepped septums do not extend beyond the plates.

In other examples, the linear arrays 700, 720, and 740 of FIGS. 7A and 7B may include different numbers of elements. The linear arrays 700 and 720 may be formed via manufacturing techniques described herein.

Figure 8:
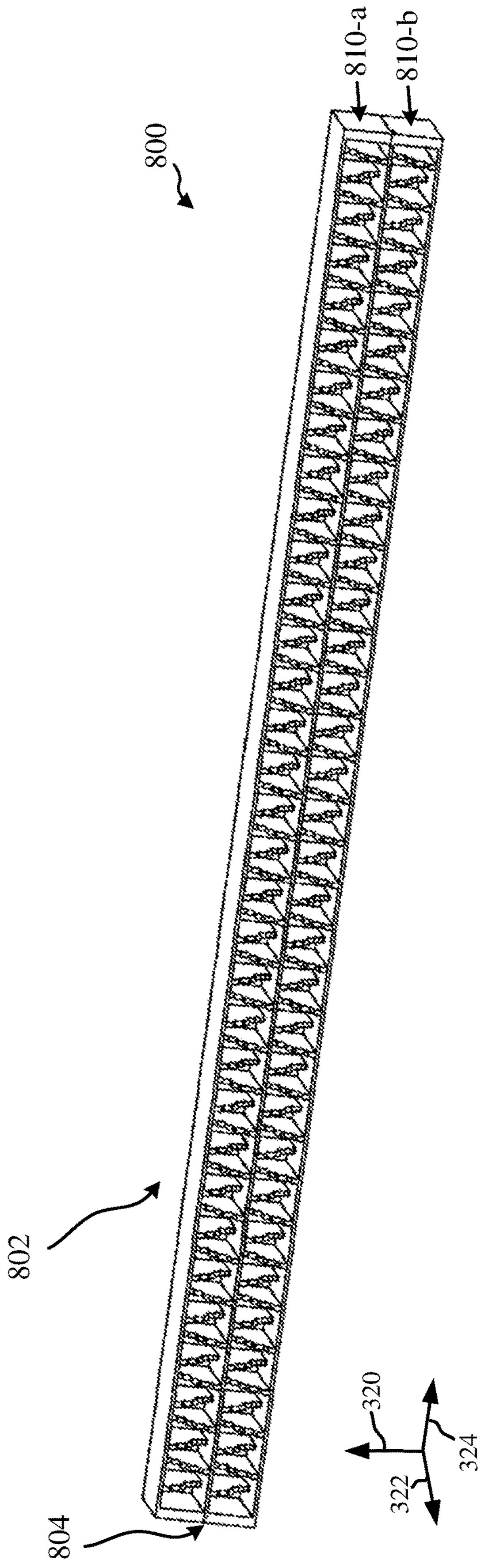
FIG. 8 illustrates an example of two stacked linear arrays in a dual-polarized antenna array in accordance with aspects of the present disclosure.

FIG. 8 illustrates an example of stacked linear arrays 800 for a dual-polarized antenna array in accordance with aspects of the present disclosure. The stacked linear arrays 800 may include any two linear arrays described herein stacked together. As described herein, stacked together may refer to the linear arrays being adjacent to each other, and they may be formed using the manufacturing techniques described herein. For example, the stacked linear arrays 800 may not be two separate arrays that are stacked together, but rather formed together in a stacked configuration.

In the example of FIG. 8, the stacked linear arrays 800 includes a plurality of parallel plate polarizers 802, each with 32 elements. In other examples, other numbers of parallel plate polarizers or linear arrays may be used, which may have different numbers of elements. In some examples, the stacked linear arrays 800 form a rectangle or a square shape. In other examples, other shapes are formed, such as curved shapes, or shapes made to accommodate a structure on which the stacked linear arrays 800 may be mounted on or part of.

In some examples, the two stacked linear array 800 form a portion of a dual-polarized antenna array that includes a plurality of parallel plate polarizers comprising the parallel plate polarizer, and where, for at least a subset of the plurality of parallel plate polarizers the upper plate of one of a pair of adjacent parallel plate polarizers and the lower plate of the other one of the pair of adjacent parallel plate polarizers are a same plate. The two stacked linear array 800 may be repeated to form a larger array.

In some examples, the plurality of stepped septums for the one of the pair of adjacent parallel plate polarizers are aligned with the plurality of stepped septums for the other one of the pair of adjacent parallel plate polarizers in a dimension parallel to the upper and lower plates of the first parallel plate polarizer. In other examples, the plurality of stepped septums for the one of the pair of adjacent parallel plate polarizers may be offset from the plurality of stepped septums for the other one of the pair of adjacent parallel plate polarizers in a dimension parallel to the upper and lower plates of the plurality of parallel plate polarizers. For example, a stepped septum of a first set of stepped septums for one of the pair of adjacent parallel plate polarizers may be aligned (e.g., in an X-axis 324) with a stepped septum of a second set of stepped septums (e.g., inverted along the Y-axis from the first set of stepped septums) in the other one of the pair of adjacent parallel plate polarizers.

In some examples, the two stacked linear array 800 may include the plurality of parallel plate polarizers 802, where for at least a subset of the plurality of parallel plate polarizers the upper plate of one of a pair of adjacent parallel plate polarizers and the lower plate of an other one of the pair of adjacent parallel plate polarizers are a same plate 804. The two stacked linear array 800 may include a first common port 810-*a* and a second common port 810-*b*.

Figure 9:
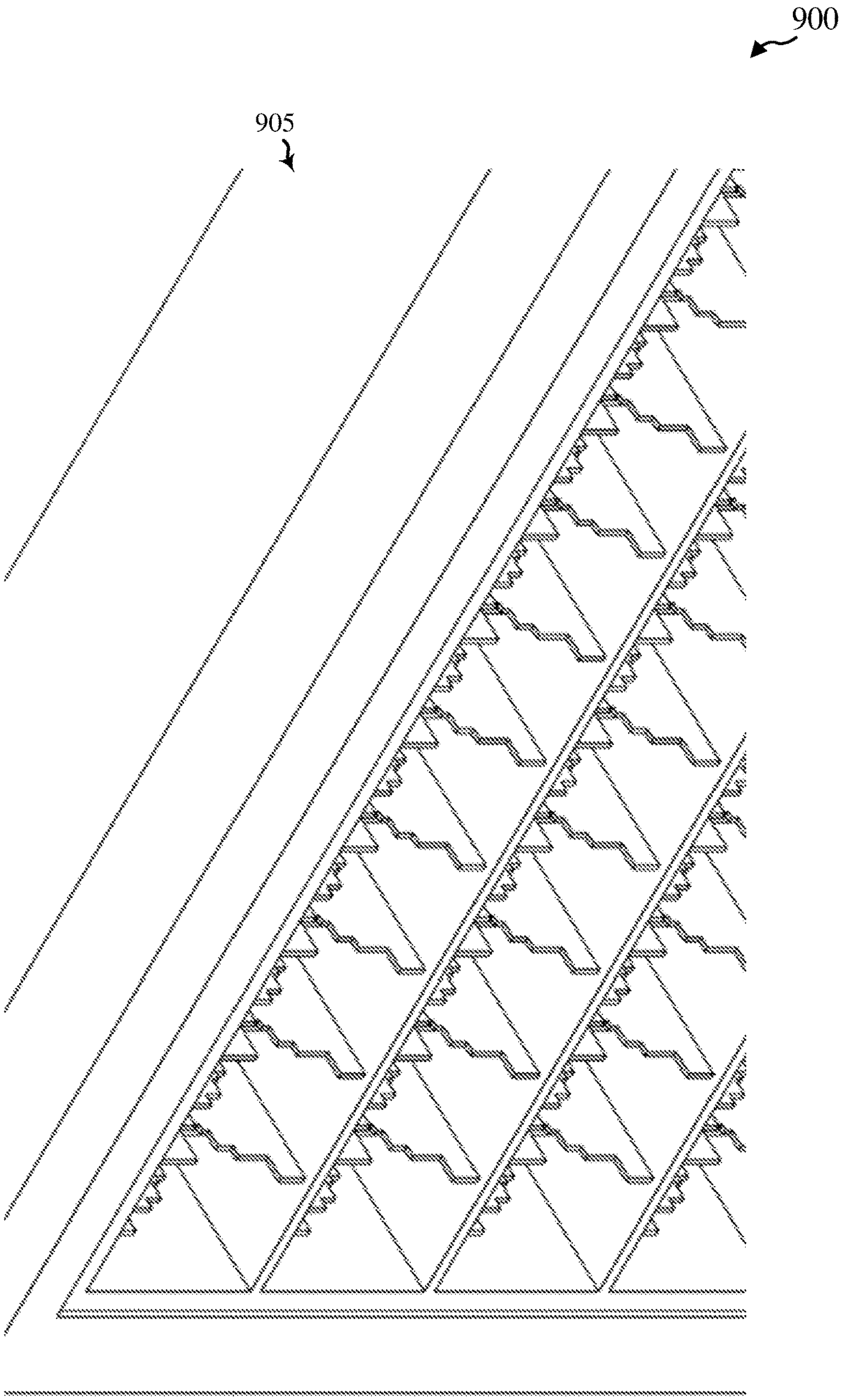
FIG. 9 illustrates an example of a portion of a dual-polarized antenna array in accordance with aspects of the present disclosure.

FIG. 9 illustrates an example of a portion of a dual-polarized antenna array 900 in accordance with aspects of the present disclosure. The portion of the dual-polarized antenna array 900 may include any number of linear arrays described herein stacked together, such as the linear arrays 700 and 720 of FIGS. 7A and 7B, or the linear array 800 of FIG. 8. The portion of the dual-polarized antenna array 900 may include a housing 905 that provides structural support for the linear arrays. The portion of the dual-polarized antenna array 900 may be part of a waveguide device as described herein.

Figure 10A:
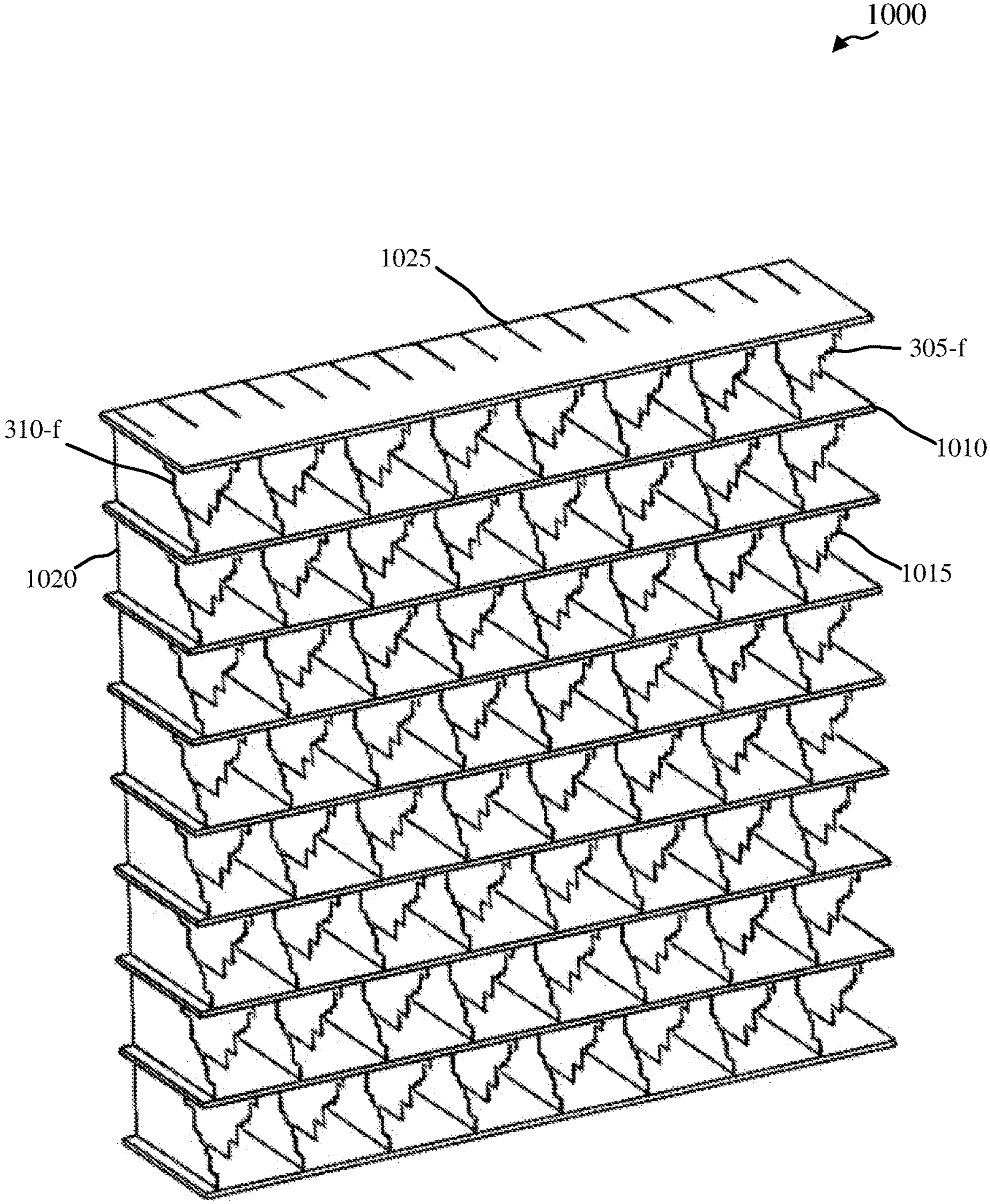
FIGS. 10A and 10B illustrate examples of a dual-polarized antenna array in accordance with aspects of the present disclosure.

FIG. 10A illustrate an example of a dual-polarized antenna array 1000 in accordance with aspects of the present disclosure. The dual-polarized antenna array 1000 may be an example of part of a waveguide device as described herein, and may include one or more components of the linear arrays as described herein. The dual-polarized antenna array 1000 may include a plurality of stepped septums that are alternatively inverted. The dual-polarized antenna array 1000 may include slots in the plates and cutouts in the plurality of stepped septums. The slots may be used to put the planar parts of the antenna array together. The dual-polarized antenna array 1000 may include a plurality of linear arrays arranged in columns. The dual-polarized antenna array 1000 may be formed using the manufacturing process described with respect to FIG. 6. For example, the dual-polarized antenna array 1000 may be formed from multiple first plates 1010 having slots 1025, multiple second plates 1015 fit into alternating slots 1025 of the first plates and forming the first set of septums 305-*f* for each row of the dual-polarized antenna array 1000, and multiple third plates 1020 fit into the other alternating slots 1025 of the first plates and forming the second set of septums 310-*f* for each row of the dual-polarized antenna array 1000. In some examples, the dual-polarized antenna array 1000 may further include sidewall features in the plates and/or cutouts in transition regions of the plurality of stepped septums.

The dual-polarized antenna array 1000 may include a plurality of polarizer unit cells. Each polarizer unit cell may include an upper surface, a lower surface, a first septum, and a second septum. The lower surface may oppose the upper surface, wherein a first edge of the upper surface and a first edge of the lower surface form an air interface plane of the dual-polarized antenna array 1000. The first septum may have first and second surfaces that are perpendicular to the air interface plane and an edge feature comprising one or more surfaces, wherein normals of the one or more surfaces of the edge feature of the first septum are parallel to the first and second surfaces of the first septum, and wherein, at a first side of a transition region of the first septum, the edge feature of the first septum contacts the upper surface and a gap is present between the edge feature of the first septum and the lower surface, and, at a second side of the transition region, the edge feature of the first septum contacts the upper surface and the lower surface. Similarly, the second septum may have first and second surfaces that are perpendicular to the air interface plane and an edge feature comprising one or more surfaces, wherein normals of the one or more surfaces of the second edge feature are parallel to the first and second surfaces of the second septum, and wherein, at a first side of a transition region of the second septum, the edge feature of the second septum contacts the lower surface and a gap is present between the edge feature of the second septum and the upper surface, and, at a second side of the transition region, the edge feature of the second septum contacts the upper surface and the lower surface. In the dual-polarized antenna array 1000, a first divided waveguide may be formed by a first portion of the upper surface, a first portion of the lower surface, a portion of the first surface of the first septum and a portion of the first surface of the second septum. A second divided waveguide may be formed by a second portion of the upper surface, a second portion of the lower surface, a portion of the second surface of the second septum and a portion of a second surface of the second septum of an adjacent polarizer unit cell.

Figure 10B:
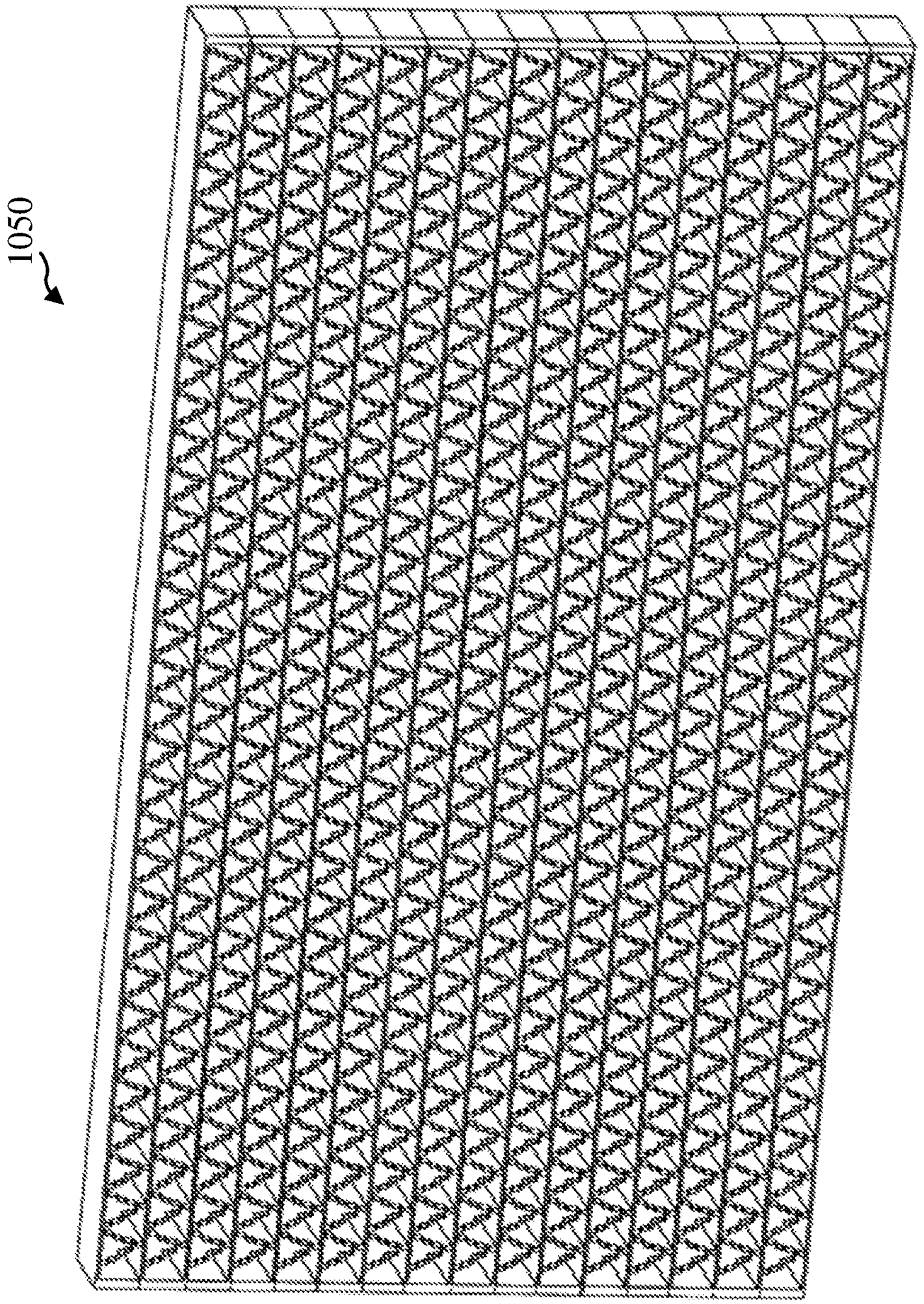

FIG. 10B illustrate an example of a dual-polarized antenna array 1050 in accordance with aspects of the present disclosure. The dual-polarized antenna array 1050 may be an example of part of a waveguide device as described herein, and may include one or more components of the linear arrays as described herein. The dual-polarized antenna array 1050 may include a plurality of stepped septums that are alternatively inverted and form stacked linear arrays. In the example of FIG. 10B, a 16 row array is illustrated with a total of 512 elements. In other examples, other numbers of rows and elements may be used to form the dual-polarized antenna array 1050.

Figure 11A:
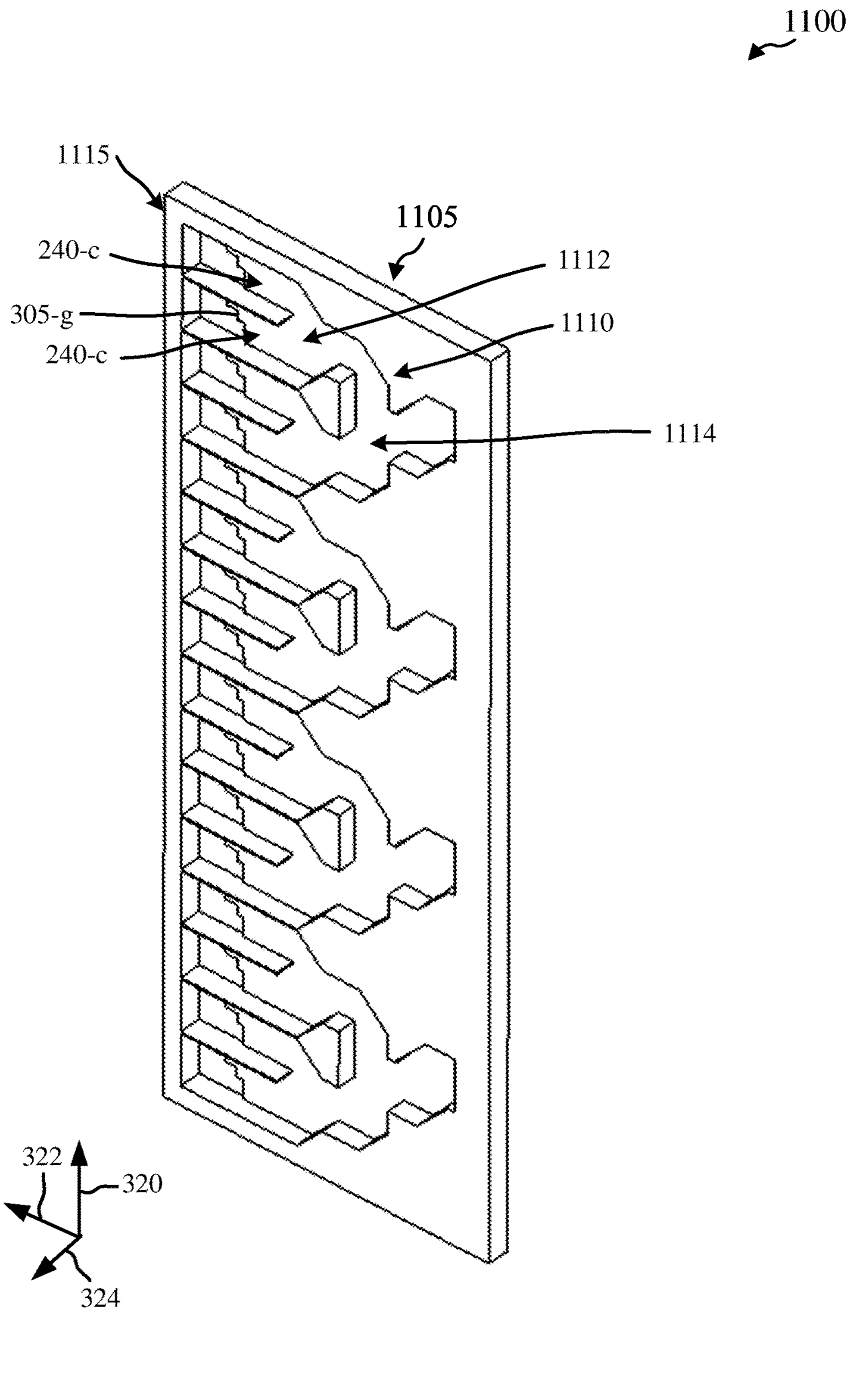
FIGS. 11A and 11B illustrate examples of portions of the dual-polarized antenna array that may couple divided waveguides of a dual-polarized antenna array in accordance with aspects of the present disclosure.

FIG. 11A illustrates an example of a portion of the dual-polarized antenna array that may couple divided waveguides of a dual-polarized antenna array in accordance with aspects of the present disclosure. The portion of the dual-polarized antenna array 1100 illustrated in FIG. 11A shows a slice of a dual-polarized antenna array that includes divided waveguides for one polarization and illustrates waveguide feed network 1110 including a first set of combiner/dividers 1112 and a second set of combiner/dividers 1114.

The portion of the dual-polarized antenna array 1100 illustrated in FIG. 11A shows the combiner/dividers located behind the antenna aperture and the linear arrays described herein. The portion of the dual-polarized antenna array 1100 may pertain to a partial column (e.g., one of two septums of an element unit) of multiple linear arrays as described herein.

The portion of the dual-polarized antenna array 1100 may include a set of first divided waveguides 240-*c*. The waveguide feed network 1110 may connect the set of first divided waveguides 240-*c* across rows of the dual-polarized antenna array and may be part of a larger waveguide feed network. The waveguide feed network 1110 may enable propagation of electromagnetic waves through the set of first divided waveguides 240-*c* to antenna feed elements or additional stages of a waveguide feed network. The portion of the dual-polarized antenna array 1100 shows multiple (e.g., four) divided waveguides 240-*c* combined along Y-axis 320. Additional stages of a waveguide feed network may couple waveguide feed networks 1110 along the Y-axis 320 or along the X-axis 324. The portion of the dual-polarized antenna array 1100 may be constructed by additive or subtractive manufacturing techniques (e.g., milling, 3D printing), and may be a planar assembly. The portion of the dual-polarized antenna array 1100 may be combined with additional planar assemblies to form a dual-polarized antenna array. It should be understood that a portion 1115 of coupling 1105 that is in front of the septums 305-*g* is shown as manufactured prior to assembly and removed for operation of the antenna array (e.g., milled away).

Figure 11B:
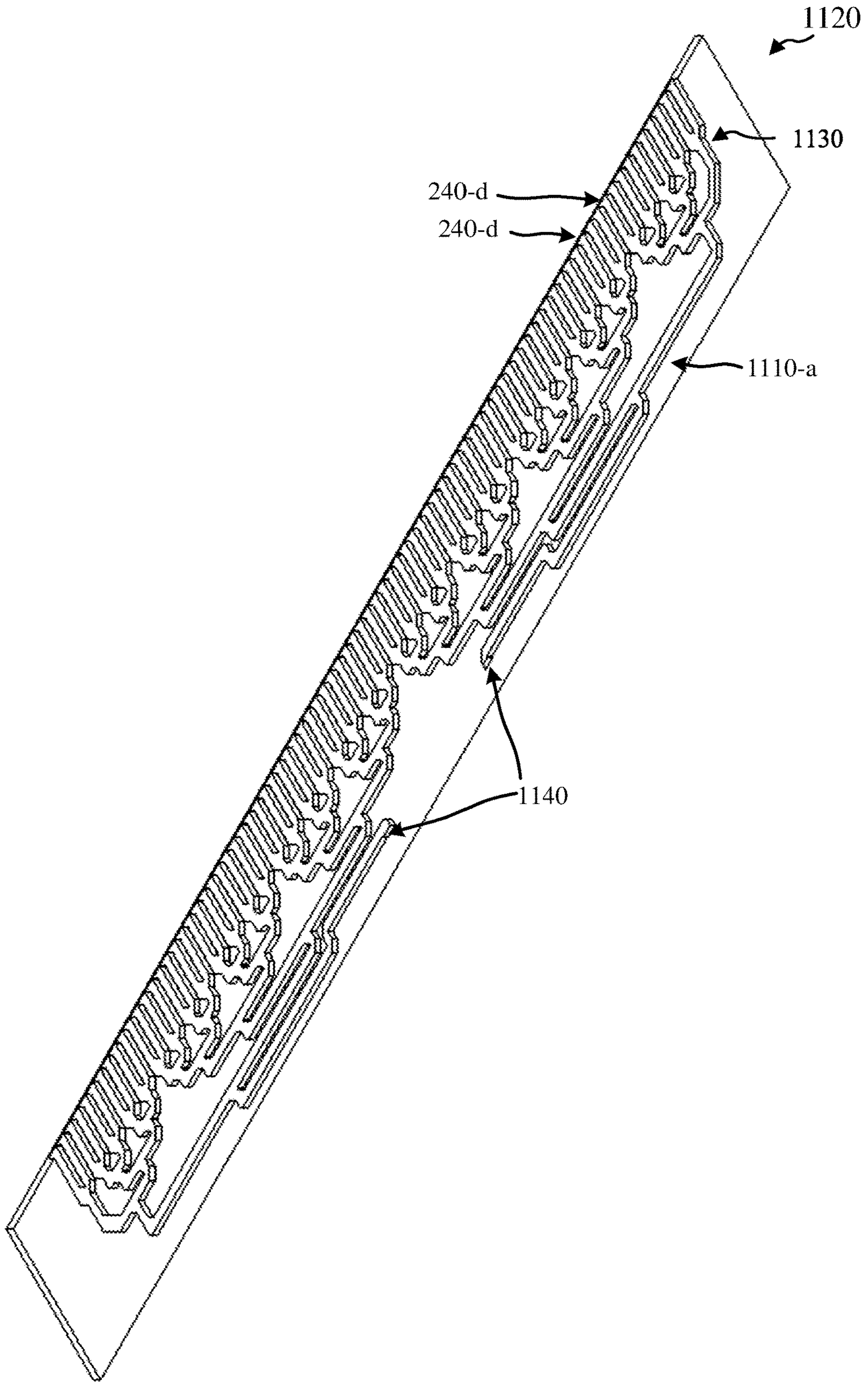

FIG. 11B illustrates another example of a portion of the dual-polarized antenna array that may couple divided waveguides or a waveguide feed network of a dual-polarized antenna array in accordance with aspects of the present disclosure. The portion of the dual-polarized antenna array 1120 illustrated in FIG. 11B shows a slice of a dual-polarized antenna array that includes divided waveguides for one polarization and illustrates multiple levels of waveguide combiner/dividers. The portion of the dual-polarized antenna array 1120 illustrated in FIG. 11B shows the combiner/dividers 1130 located behind the antenna aperture and the linear arrays described herein. The portion of the dual-polarized antenna array 1120 may pertain to a partial column (e.g., one of two septums of an element unit) of multiple linear arrays as described herein.

The portion of the dual-polarized antenna array 1120 may include a set of first divided waveguides 240-*d*. The portion of the dual-polarized antenna array 1120 may connect the set of first divided waveguides 240-*d* together using waveguide feed network 1110-*a*. The portion of the dual-polarized antenna array 1120 may enable propagation of electromagnetic waves between a common port 1140 and the set of first divided waveguides 240-*d* using the feed network 1110-*a*. While the structure of the set of first divided waveguides 240-*d* and the waveguide feed network 1110-*a* are repeating, FIG. 11B points to just one of each region for clarity. The portion of the dual-polarized antenna array 1120 may be constructed by additive or subtractive manufacturing techniques (e.g., milling, 3D printing), and may be a planar assembly. The portion of the dual-polarized antenna array 1120 may be combined with additional planar assemblies to form a dual-polarized antenna array.

Figure 12A:
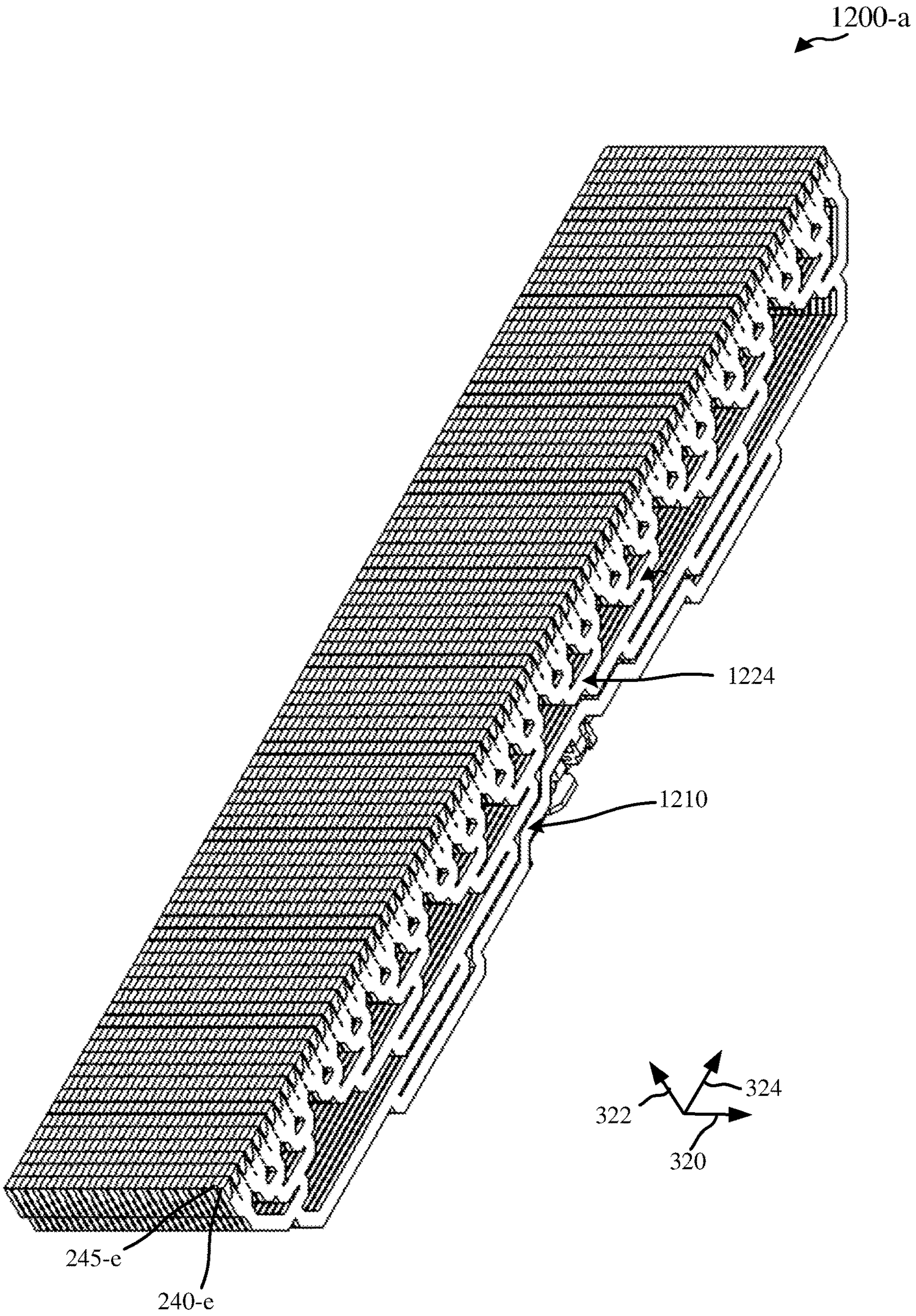
FIGS. 12A and 12B illustrates examples of a waveguide feed network between divided waveguides and a common port of a dual-polarized antenna array in accordance with aspects of the present disclosure.

FIG. 12A illustrates another example of a waveguide feed network between divided waveguides and a common port of a dual-polarized antenna array in accordance with aspects of the present disclosure. The waveguide feed network 1200-*a* illustrated in FIG. 12A may include a full array of several stacked linear arrays, and may show an alternative orientation for the septums. For example, the linear arrays may run along a Y axis 320 and be stacked along an X axis 324. FIG. 12A provides an example of horizontal septums, with combiner networks for each polarization combining horizontally (e.g., along the X axis 324) across the array prior to a vertical combination (not shown).

The waveguide feed network 1200-*a* may include a set of first divided waveguides 240-*e* and a set of second divided waveguides 245-*e*, which may alternate down a row (e.g., along Y-axis 320) and be consistent along a column (e.g., along X-axis 324). The waveguide feed network 1200-*a* may connect the set of first divided waveguides 240-*e* and the set of second divided waveguides 245-*e* with corresponding common ports (not shown). The waveguide feed network 1200-*a* may enable propagation of electromagnetic waves between the common ports associated with different polarizations and the set of first divided waveguides 240-*e* and the set of second divided waveguides 245-*e*. The waveguide feed network 1200-*a* may include a first waveguide feed network 1210 associated with the first set of divided waveguides 240-*e*. While the structure of the set of first divided waveguides 240-*e*, the set of second divided waveguides 245-*e*, and the combiner/dividers 1224 are repeating, FIG. 12A points to just one of each for clarity.

The waveguide feed network 1200-*a* illustrates an example of an air model of a waveguide combiner/divider. The air model may be defined by one or more assemblies that are constructed with additive or subtractive manufacturing methods (e.g., milling, 3D printing).

Figure 12B:
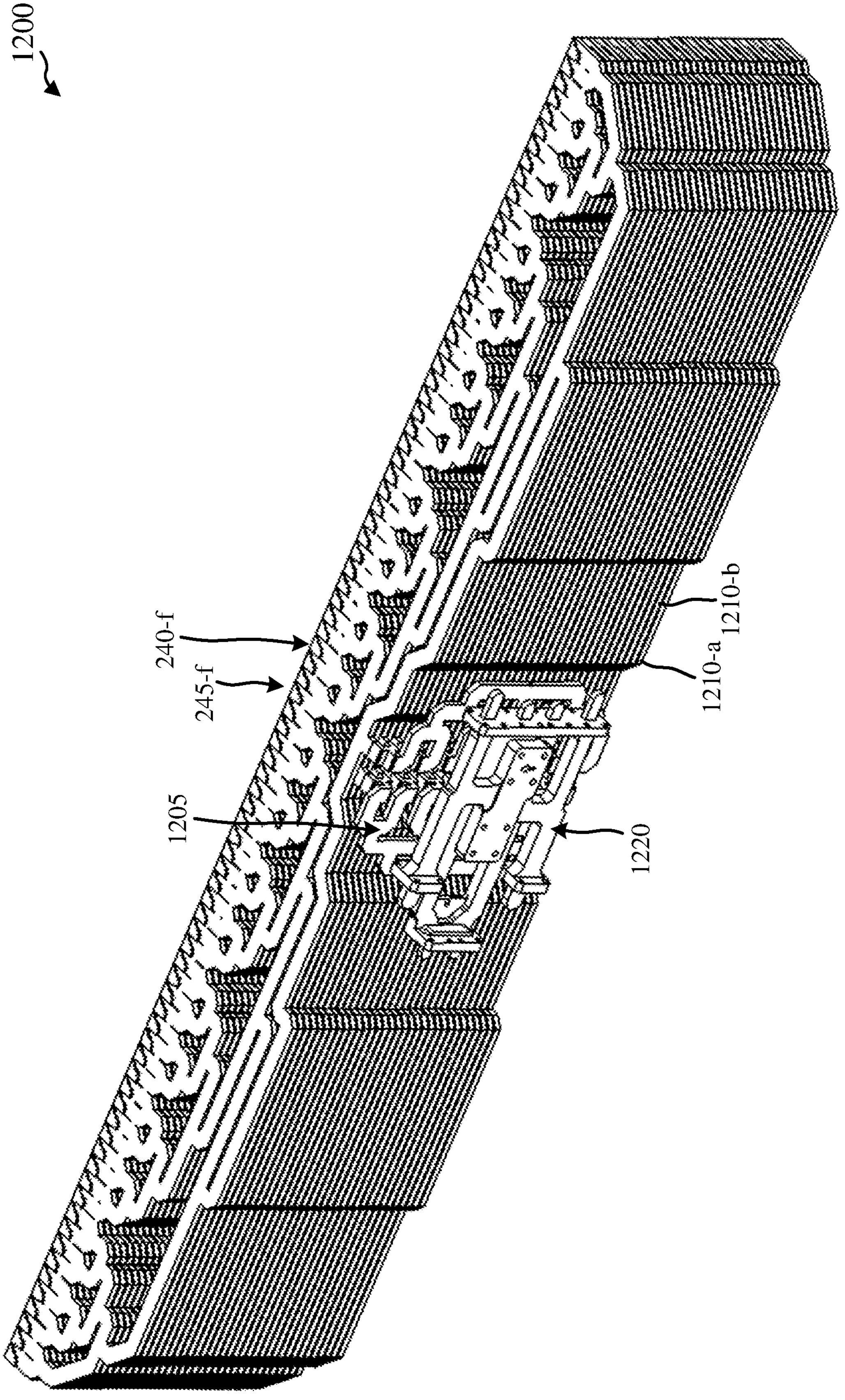

FIG. 12B illustrates an example of a back perspective view of a waveguide feed network 1200-*b* for a dual-polarized antenna array in accordance with aspects of the present disclosure. FIG. 12B shows an air model of a back perspective view of the waveguide feed network 1200-*b*, which illustrates a first waveguide feed network 1210-*a* coupled with a first set of divided waveguides 240-*f* and a second waveguide feed network 1210-*b* coupled with a second set of divided waveguides 245-*f*. The dual-polarized antenna array 1200 may include a plurality of elevation combiners 1205 and a dual-duplexing filter assembly 1220. In some examples, the dual-duplexing filter assembly 1220 includes two common ports, including a common port associated with a first polarization (e.g., and the first set of divided waveguides 240-*f*), and a second common port associated with a second polarization (e.g., and the second set of divided waveguides 245-*f*). In some examples, the back perspective view of the waveguide feed network 1200-*b* may show vertical combiner/dividers of the antenna array views shown in FIG. 12A.

Figure 13:
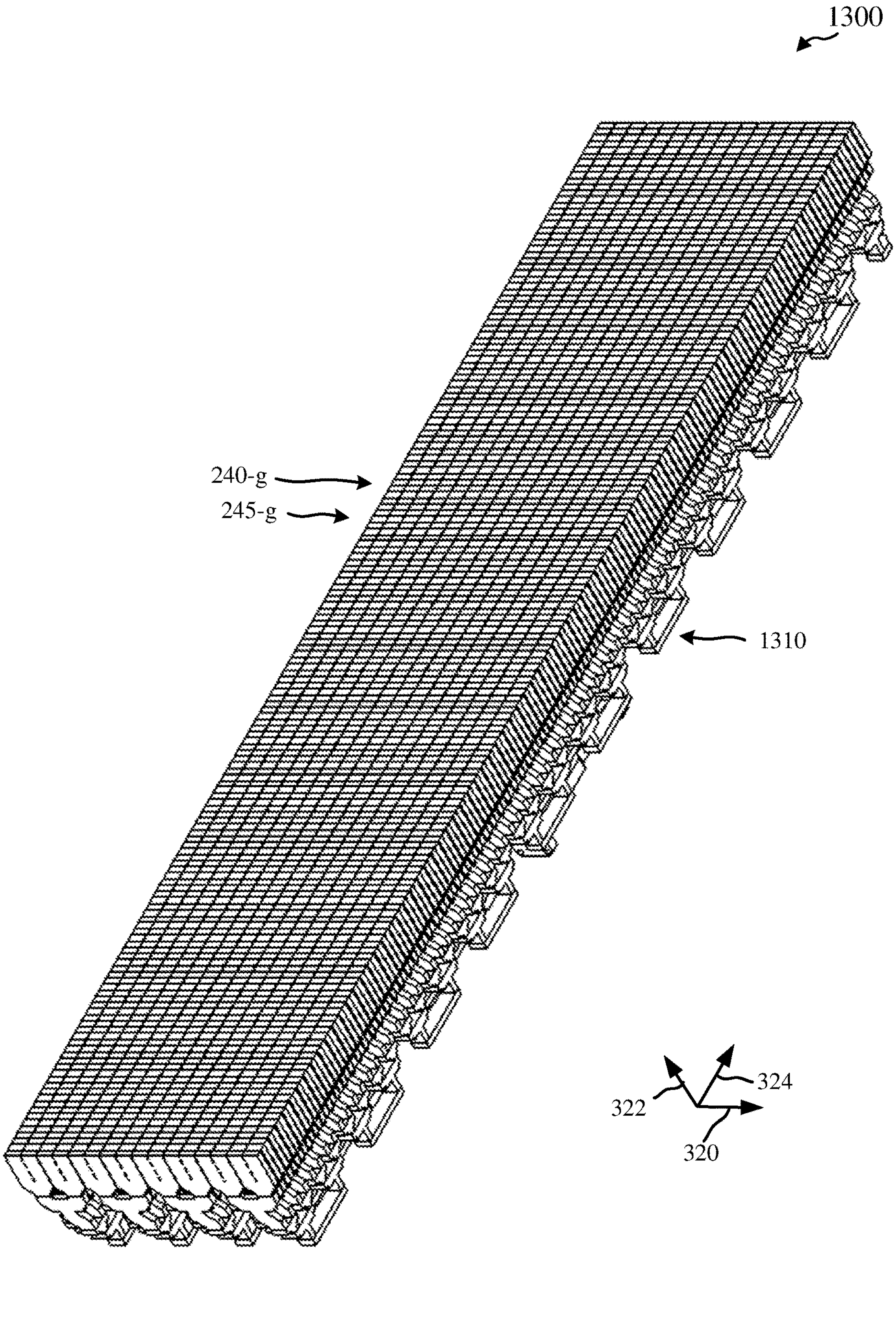
FIG. 13 illustrates an example of a front perspective view of a waveguide feed network for a dual-polarized antenna array in accordance with aspects of the present disclosure.

FIG. 13 illustrates an example of a front perspective view of a waveguide feed network for a dual-polarized antenna array in accordance with aspects of the present disclosure. FIG. 13 shows an air model of a front perspective view of the waveguide feed network 1300 that shows combiner/dividers 1310 coupled with a first set of divided waveguides 240-*g* or a second set of divided waveguides 245-*g*. In the example shown in FIG. 13, a first set of four divided waveguides may be combined vertically (e.g., along Y-axis 320) and then may be combined horizontally (e.g., along X-axis 324). The example of FIG. 13 illustrates a waveguide feed network for a dual-polarized antenna array having septums arranged in a vertical orientation.

Figure 14:
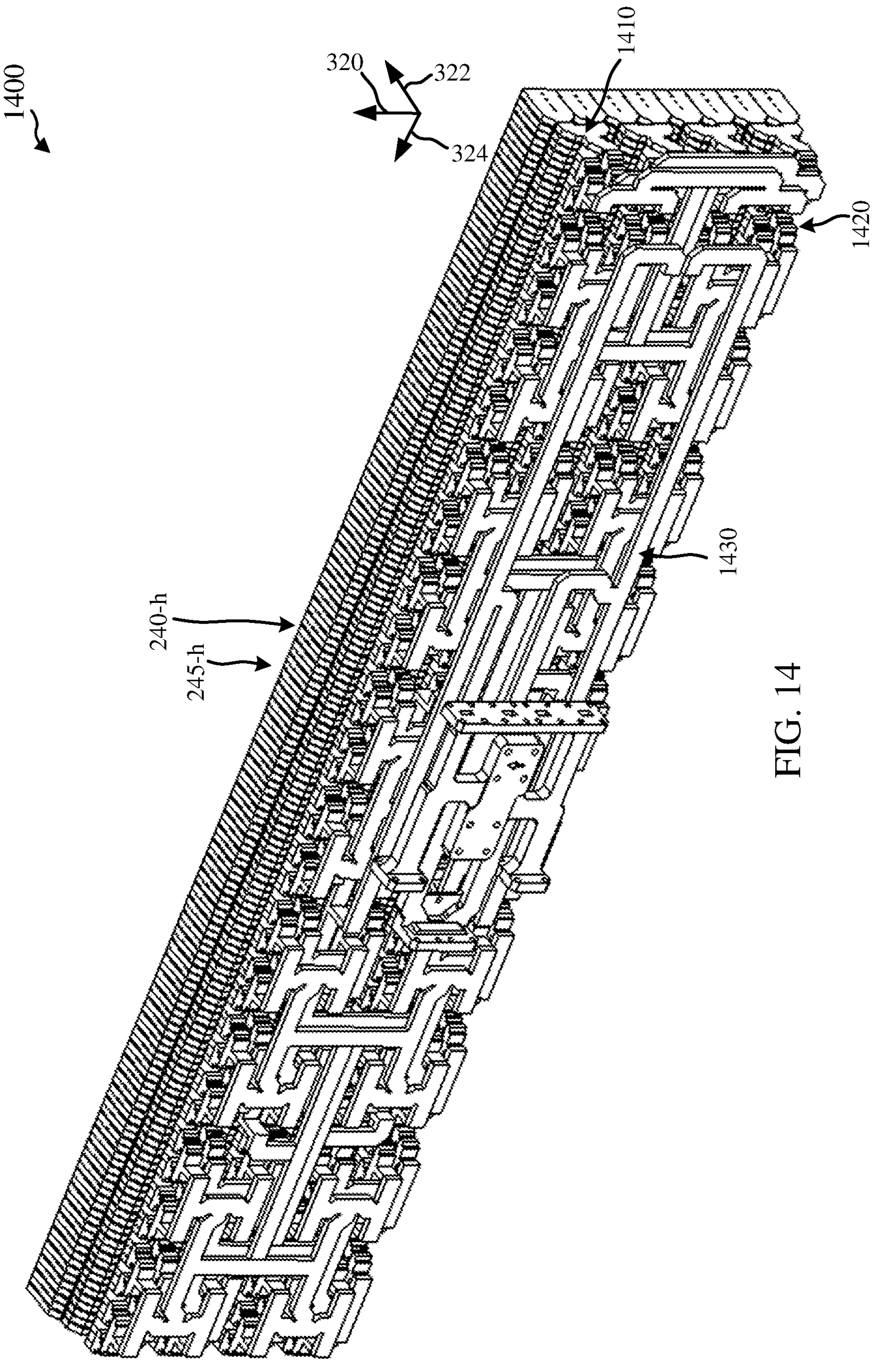
FIG. 14 illustrates another example of a back perspective view of a waveguide feed network for a dual-polarized antenna array in accordance with aspects of the present disclosure.

FIG. 14 illustrates another example of a back perspective view of a waveguide feed network for a dual-polarized antenna array in accordance with aspects of the present disclosure. FIG. 14 shows an air model of a back perspective view of the waveguide feed network 1400, which illustrates multiple stages of combiner/dividers coupled with a first set of divided waveguides 240-*h* or a second set of divided waveguides 245-*h*. For example, waveguide feed network 1400 may include, for each polarization, a first stage 1410, a second stage 1420, and a third stage 1430. The first stage may generally have combiner/dividers oriented along the Z-axis 322 and the combiner/dividers may be of a first type (e.g., H-plane combiner/dividers), the second stage 1420 may generally have combiner/dividers oriented along the Z-axis 322 and the combiner/dividers may be of a second type (e.g., E-plane combiner/dividers), and the third stage 1430 may have combiner/dividers oriented along the X-axis 324 and Y-axis 320 (e.g., may be in a plane defined by the X-axis and the Y-axis) and the combiner/dividers may be of the first type (e.g., H-plane combiner/dividers). In some examples, the back perspective view of the waveguide feed network 1400 may correspond to the front perspective view of the waveguide feed network 1300 of FIG. 13.

Figure 15:
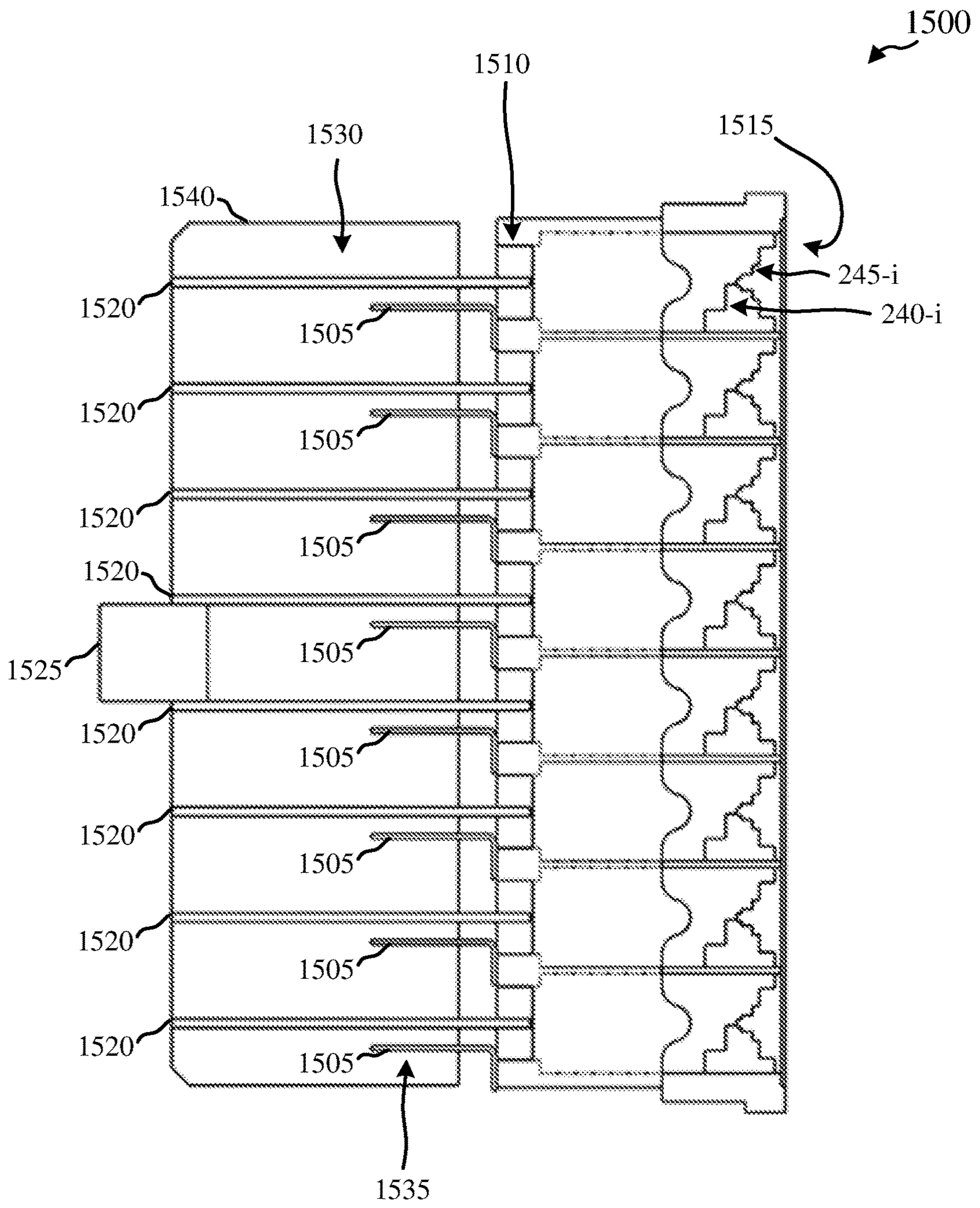
FIG. 15 illustrates an example of an internal side view of a dual-polarized antenna array in accordance with aspects of the present disclosure.

FIG. 15 illustrates an example of an internal side view of a dual-polarized antenna array 1500 in accordance with aspects of the present disclosure. The dual-polarized antenna array 1500 may be an example of a scanning dual-polarized antenna array. The dual-polarized antenna array 1500 may be included in a waveguide device, such as the waveguide device 200 of FIG. 2, or a component of the dual-polarized antenna array 140 of FIG. 1. The dual-polarized antenna array 1500 may be part of an antenna array installed onboard an aircraft, such as aircraft 130 of FIG. 1, or may be used with other devices or systems. The dual-polarized antenna array 1500 may be part of any of the example antenna arrays described herein.

The dual-polarized antenna array 1500 shows a side view that illustrates an interface 1510 between a plurality of circuit cards 1520 and a first set of divided waveguides 240-*i* and a second set of divided waveguides 245-*i*. The dual-polarized antenna array 1500 has a plurality of apertures 1515, the first set of divided waveguides 240-*i* and the second set of divided waveguides 245-*i*, coupled to a plurality of interfaces 1510. The interfaces 1510 provide a way to connect antenna feeds from the divided waveguides 240-*i*, 245-*i*, to a plurality of circuit cards 1520. That is, the interfaces 1510 provide connection between the plurality of circuit cards 1520 and the first set of divided waveguides 240-*i* and the second set of divided waveguides 245-*i* (e.g., using antenna feeds that are part of the circuit cards or attached to the circuit cards and disposed in the divided waveguides). Each of the plurality of circuit cards 1520 may be supported by one of a plurality of shelves 1505. In some examples, the plurality of circuit cards 1520 may be printed circuit boards.

The dual-polarized antenna array 1500 may also include a distribution circuit 1540. The distribution circuit 1540 may be used in conjunction with other distribution circuits in a larger antenna array. In one example, the distribution circuit 1540 may be a quadrant card that can be used with three other cards in a larger antenna array. The dual-polarized antenna array 1500 may also include a plug 1525.

In some examples, because there are two polarizations present in the dual-polarized antenna array 1500, there may be two elevation combiners as part of the waveguide feed network 1110-*f*. An elevation combiner card (not shown) may electronically process the waveforms in the two elevation combiners.

In some examples, each of the plurality of circuit cards 1520 is coupled with a subset of the plurality of the antenna feeds. In some examples, each of the plurality of circuit cards 1520 comprises an electrical beam forming network 1530. In some examples, the electrical beam forming network 1530 of the each of the plurality of circuit cards 1520 comprises a plurality of beamforming circuits 1535, each beamforming circuit associated with one or more of the antenna feeds. For example, each beamforming circuit could be coupled with several adjacent feeds. In some examples, the dual-polarized antenna array 1500 may have a combination of waveguide feed networks and beamforming circuits 1535. For example, several adjacent divided waveguides may be combined with a feed network and share an antenna feed fed by a beamforming circuit. In some examples, the dual-polarized antenna array 1500 may support multi-beam applications.

In some examples, the dual-polarized antenna array 1500 may also include a plurality of distribution circuits, such as the distribution circuit 1540, wherein each of the plurality of distribution circuits is coupled with at least a subset of the plurality of circuit cards 1520 and provides a first signal associated with the first polarization and a second signal associated with the second polarization to the at least the subset of the plurality of circuit cards 1520. In some examples, the first polarization is a first circular polarization and the second polarization is a second circular polarization. In other examples where the septums become an OMT, the first polarization is a first linear polarization and the second polarization is a second linear polarization.

In some examples, each of the plurality of circuit cards 1520 is coupled with the subset of the plurality of antenna feeds that are within the respective waveguides of the plurality of first divided waveguides 240-*i* and the plurality of second divided waveguides 245-*i* for one parallel plate polarizer of the plurality of parallel plate polarizers.

In some examples, each of the plurality of circuit cards 1520 comprises a plurality of ADCs and a plurality of DACs, and wherein each of the plurality of ADCs and the plurality of DACs is coupled with one or more of the plurality of antenna feeds.

Figure 16A:
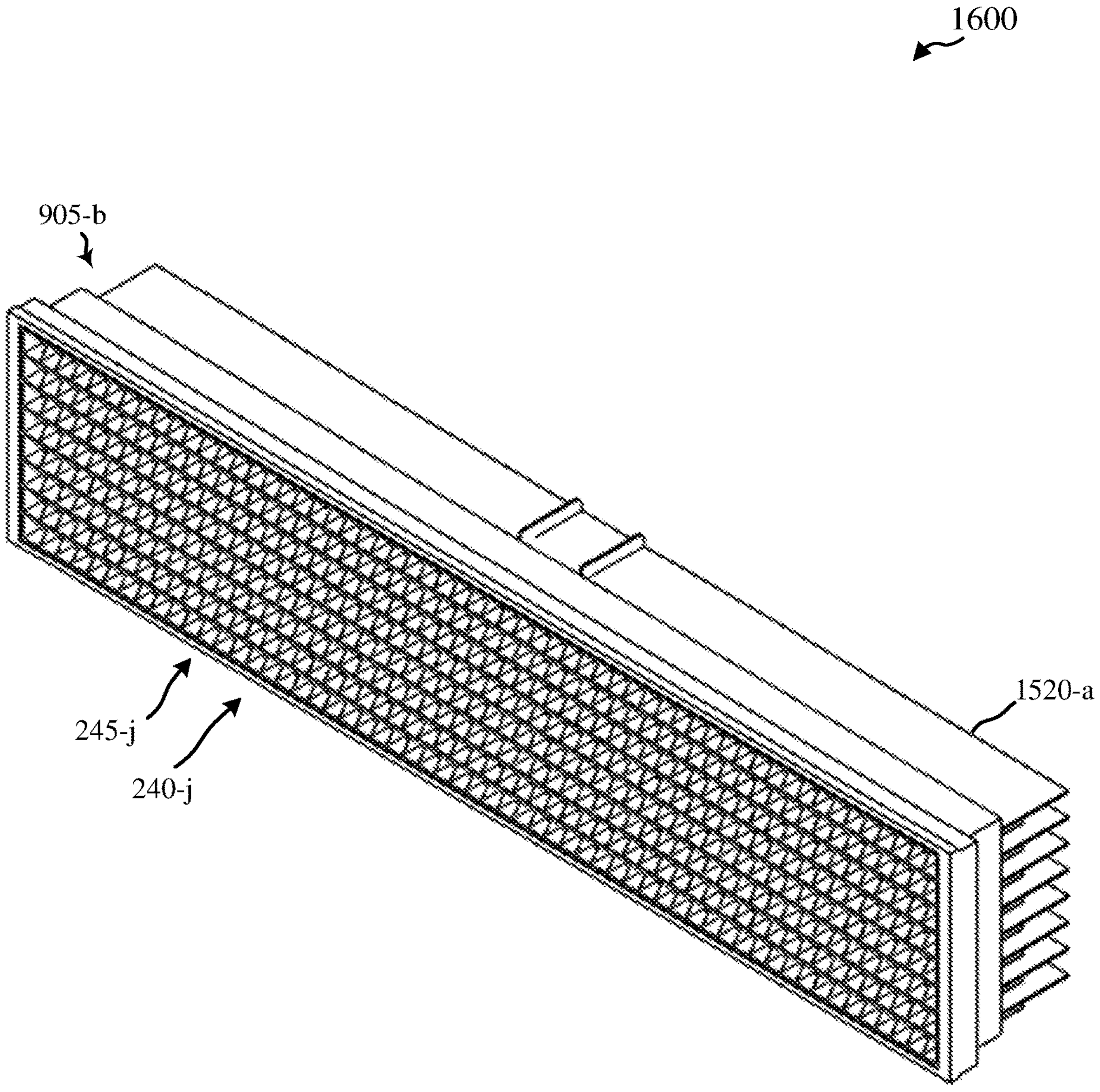
FIGS. 16A through 16C illustrate example perspective views of a scanning dual-polarized antenna array in accordance with aspects of the present disclosure.

FIG. 16A illustrates an example front perspective view of a scanning dual-polarized antenna array 1600 in accordance with aspects of the present disclosure. The dual-polarized antenna array 1600 may be an example of a dual-polarized antenna array. The dual-polarized antenna array 1600 may be included in a waveguide device, such as the waveguide device 200 of FIG. 2, or a component of the dual-polarized antenna array 140 of FIG. 1. The dual-polarized antenna array 1600 may be part of an antenna array installed onboard an aircraft, such as aircraft 130 of FIG. 1, or may be used with other devices or systems. The dual-polarized antenna array 1600 may be part of any of the example antenna arrays described herein. For example, the dual-polarized antenna array 1600 may be an aspect or include one or more aspects of the dual-polarized antenna array 1500 of FIG. 15.

The dual-polarized antenna array 1600 includes a first set of divided waveguides 240-*j* and a second set of divided waveguides 245-*j* coupled to a plurality of circuit cards 1520-*a*. The dual-polarized antenna array 1600 may include a housing 905-*b* that supports the linear arrays that are included in the dual-polarized antenna array 1600.

Figure 16B:
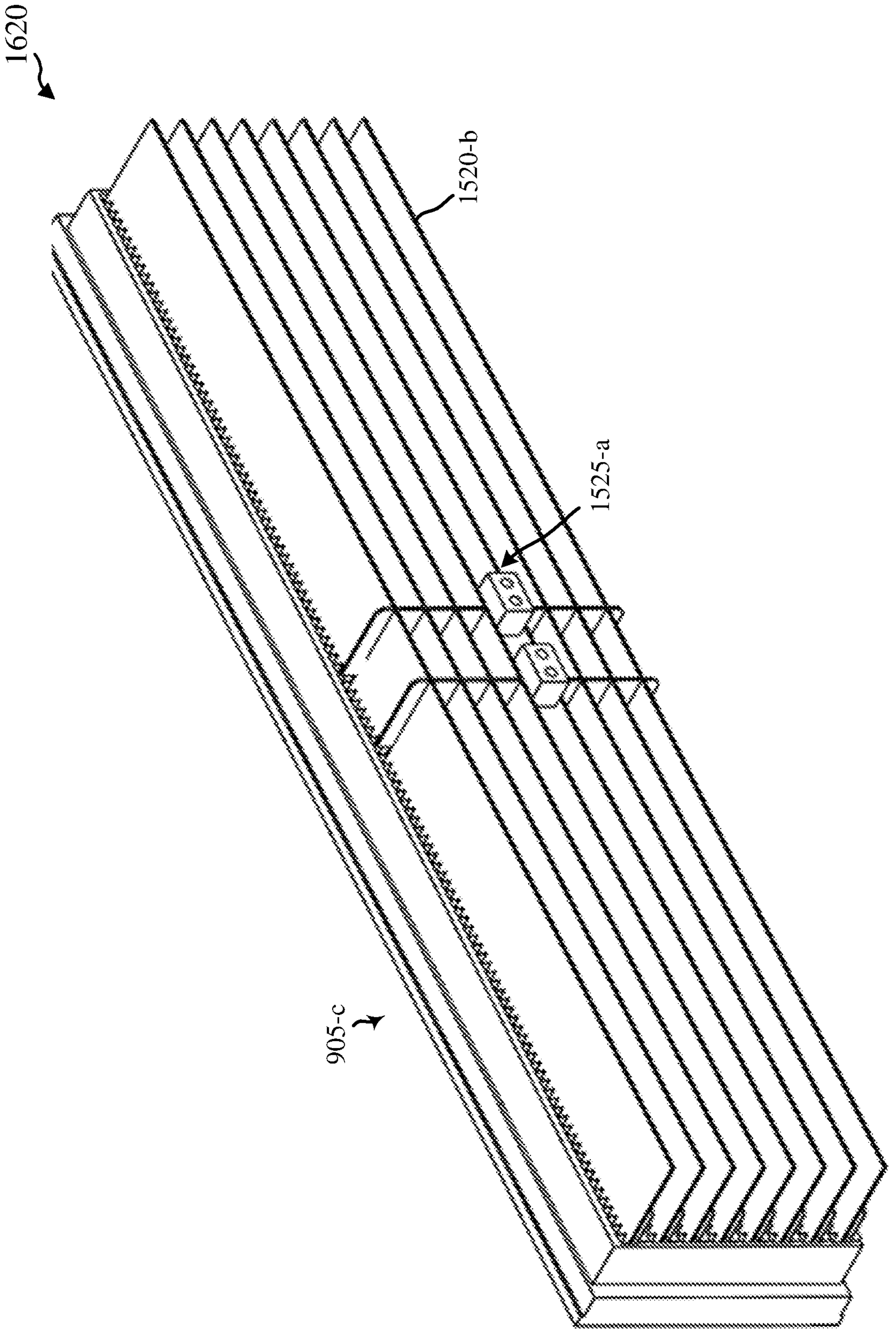

FIG. 16B illustrates an example back perspective view of a digital dual-polarized antenna array 1620 in accordance with aspects of the present disclosure. The dual-polarized antenna array 1620 may be an example of a dual-polarized antenna array. The dual-polarized antenna array 1620 may be included in a waveguide device, such as the waveguide device 200 of FIG. 2, or a component of the dual-polarized antenna array 140 of FIG. 1. The dual-polarized antenna array 1620 may be part of an antenna array installed onboard an aircraft, such as aircraft 130 of FIG. 1, or may be used with other devices or systems. The dual-polarized antenna array 1620 may be part of any of the example antenna arrays described herein. For example, the dual-polarized antenna array 1620 may be an aspect or include one or more aspects of the dual-polarized antenna array 1500 of FIG. 15 or the dual-polarized antenna array 1600 of FIG. 16.

The dual-polarized antenna array 1620 may include a first set of divided waveguides and a second set of divided waveguides coupled to a plurality of circuit cards 1520-*b*. The dual-polarized antenna array 1620 may include a housing 905-*c* that supports the linear arrays that are included in the dual-polarized antenna array 1620. The dual-polarized antenna array 1620 may include one or more plugs 1525-*a* for electronically connecting the dual-polarized antenna array 1620 to another device, such as a processor, or to electrical power. The dual-polarized antenna array 1620 may also include amplifiers, one or more element printer wiring assemblies (PWA), one or more distribution circuits, and a tile control PWA, such as those shown in FIG. 18.

Figure 16C:
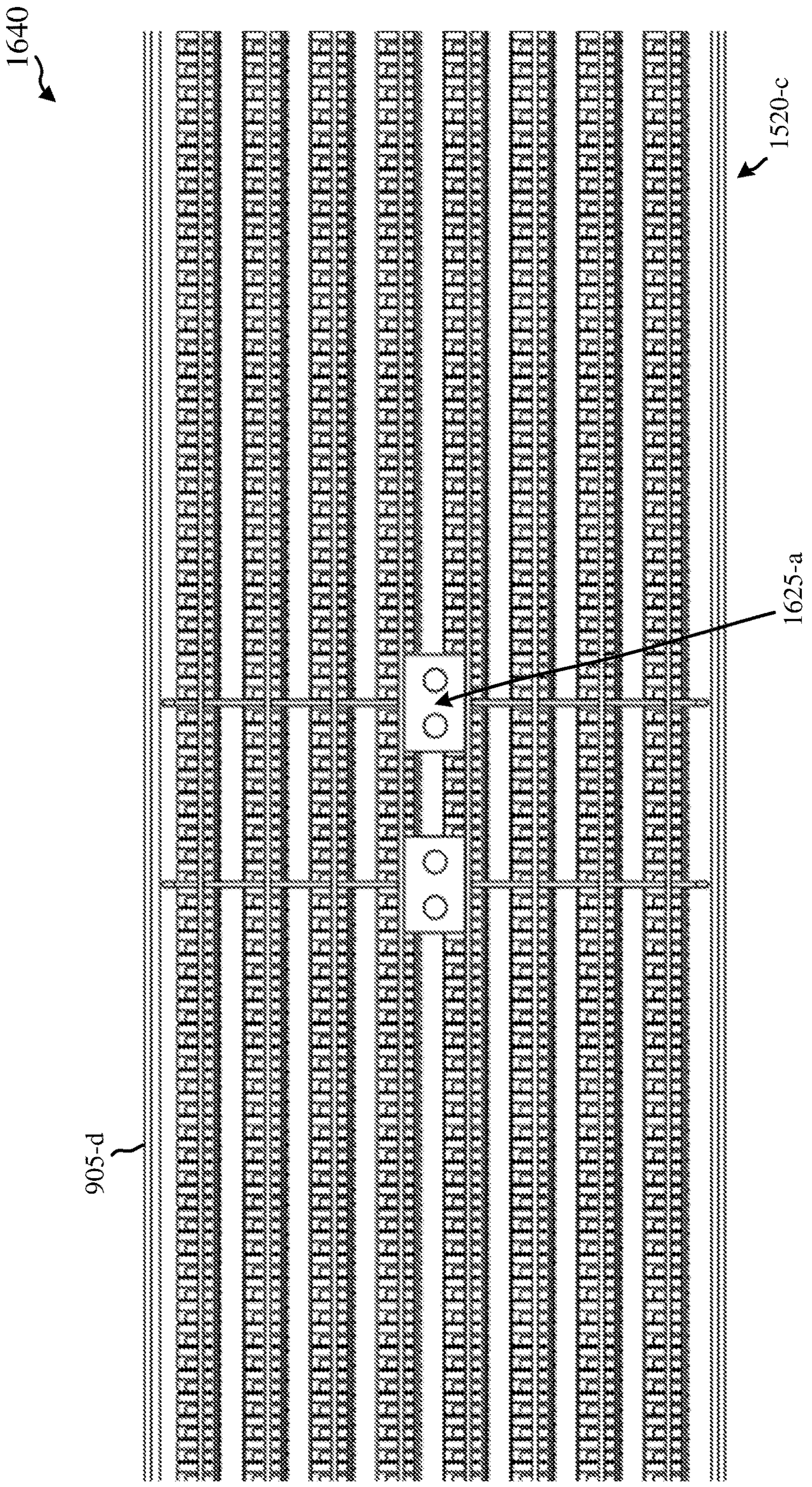

FIG. 16C illustrates another example back perspective view of a digital dual-polarized antenna array 1640 in accordance with aspects of the present disclosure. The dual-polarized antenna array 1640 may be an example of a dual-polarized antenna array. The dual-polarized antenna array 1640 may be included in a waveguide device, such as the waveguide device 200 of FIG. 2, or a component of the dual-polarized antenna array 140 of FIG. 1. The dual-polarized antenna array 1640 may be part of an antenna array installed onboard an aircraft, such as aircraft 130 of FIG. 1, or may be used with other devices or systems. The dual-polarized antenna array 1640 may be part of any of the example antenna arrays described herein. For example, the dual-polarized antenna array 1640 may be an aspect or include one or more aspects of the dual-polarized antenna array 1500 of FIG. 15 or the dual-polarized antenna arrays 1600 and 1620 of FIGS. 16A and 16B.

The dual-polarized antenna array 1640 includes a first set of divided waveguides and a second set of divided waveguides coupled to a plurality of circuit cards 1520-*c*. The dual-polarized antenna array 1640 may include a housing 905-*d* that supports the linear arrays that are included in the dual-polarized antenna array 1640. The dual-polarized antenna array 1620 may include one or more plugs 1625-*a*.

Figure 17A:
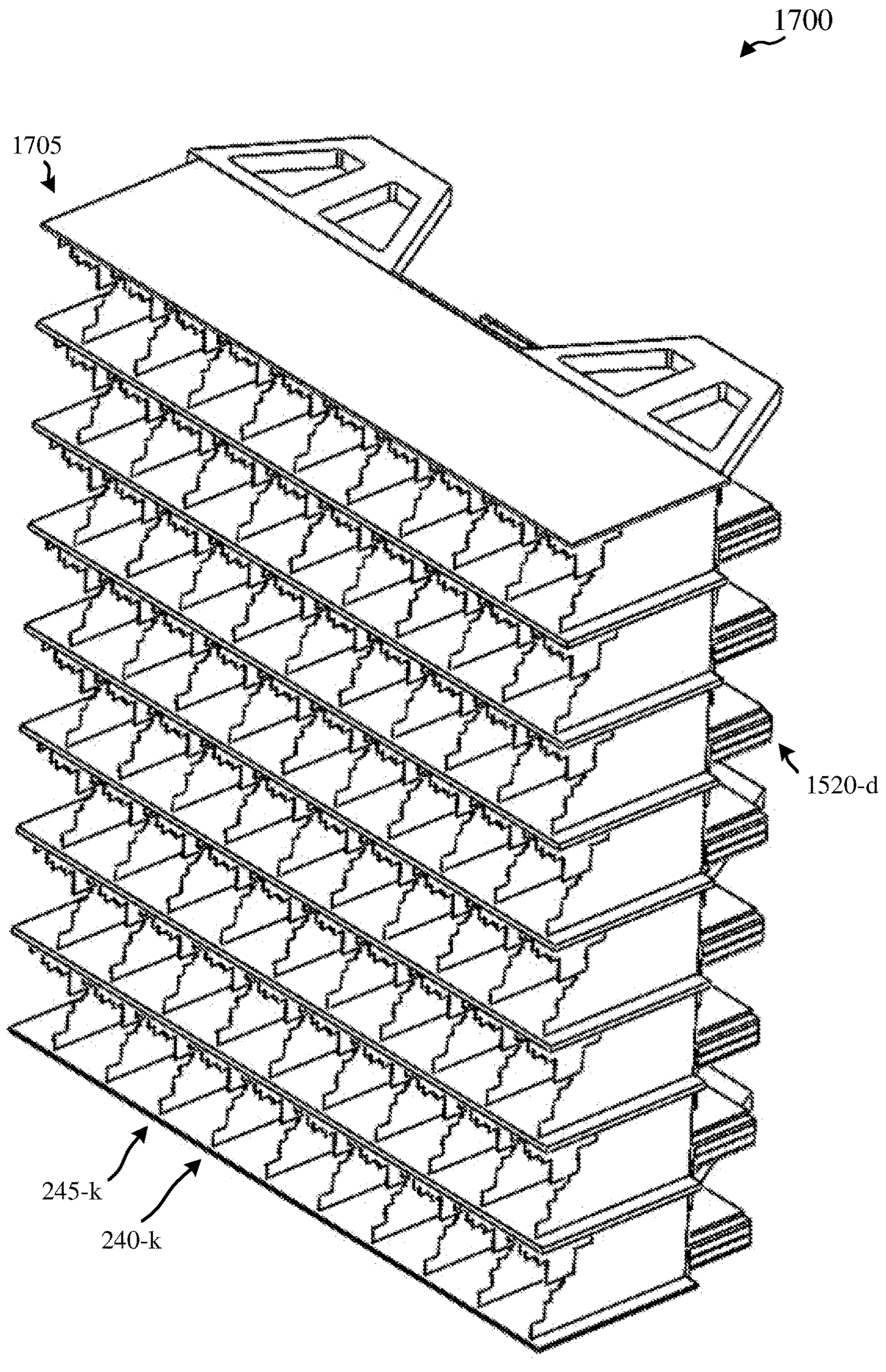
FIGS. 17A and 17B illustrate example perspective views of a scanning dual-polarized antenna array in accordance with aspects of the present disclosure.

FIG. 17A illustrates an example front perspective view of a digital dual-polarized antenna array 1700 in accordance with aspects of the present disclosure. The dual-polarized antenna array 1700 may be an example of a dual-polarized antenna array. The dual-polarized antenna array 1700 may be included in a waveguide device, such as the waveguide device 200 of FIG. 2, or a component of the dual-polarized antenna array 140 of FIG. 1. The dual-polarized antenna array 1700 may be part of an antenna array installed onboard an aircraft, such as aircraft 130 of FIG. 1, or may be used with other devices or systems. The dual-polarized antenna array 1700 may be part of any of the example antenna arrays described herein. For example, the dual-polarized antenna array 1700 may be an aspect or include one or more aspects of the dual-polarized antenna array 1500, 1600, 1620, or 1640 of FIGS. 15 and 16A through 16C. The digital dual-polarized antenna array 1700 may be one tile of a larger antenna array.

The dual-polarized antenna array 1700 includes a plurality of linear arrays 1705 that include first sets of divided waveguides 240-*k* and second sets of divided waveguides 245-*k* coupled to a plurality of circuit cards 1520-*d*. The dual-polarized antenna array 1700 illustrates a plurality of parallel assemblies, wherein each parallel assembly comprises a stepped septum from each of the plurality of parallel plate polarizers and at least a portion of a combiner/divider for the first set of divided waveguides and the second set of divided waveguides. In some examples, the parallel plate polarizer is constructed using an additive manufacturing technique, sheet metal plates, or stacked milled assemblies.

Figure 17B:
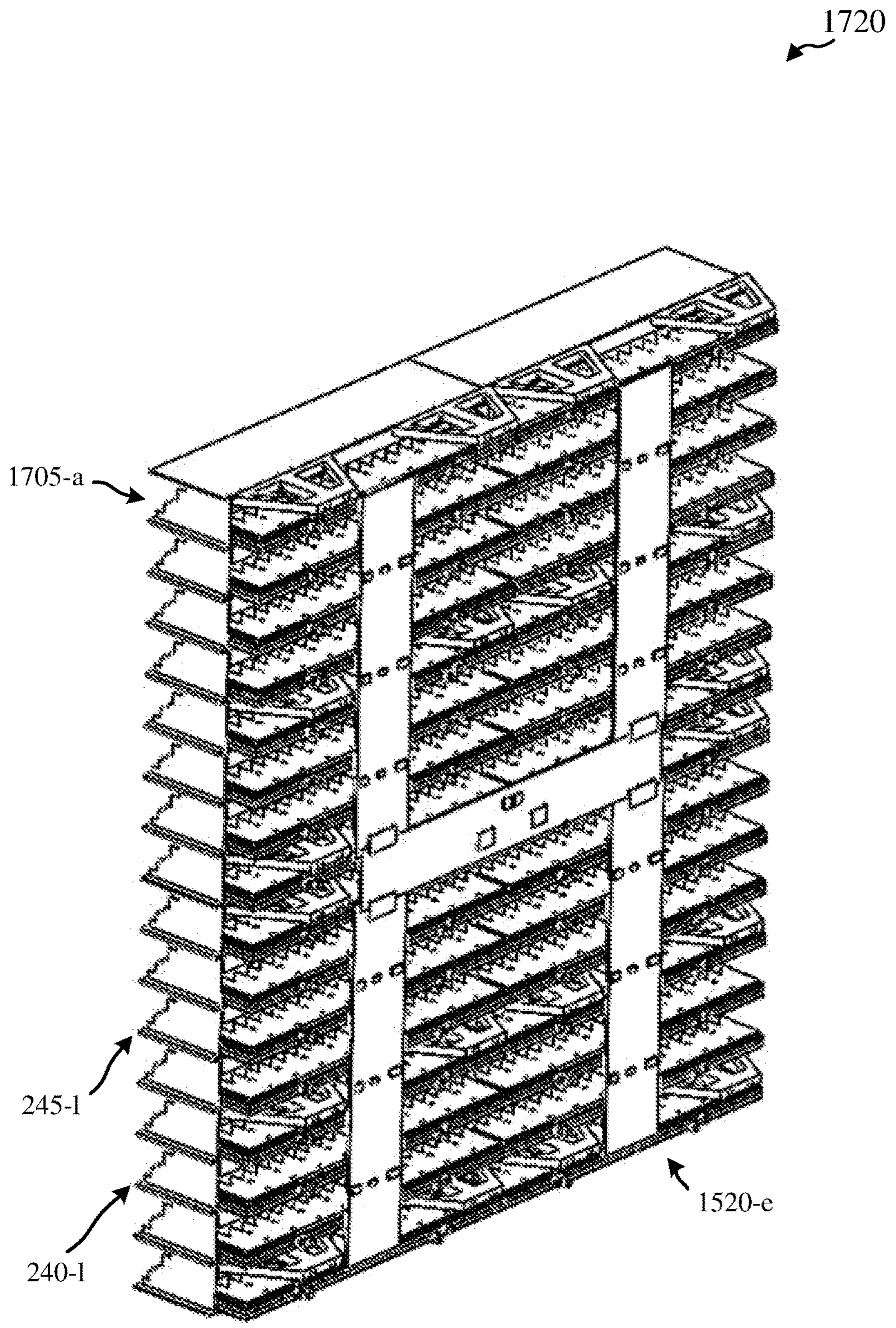

FIG. 17B illustrates an example back perspective view of a digital dual-polarized antenna array 1720 in accordance with aspects of the present disclosure. The dual-polarized antenna array 1720 may be included in a waveguide device, such as the waveguide device 200 of FIG. 2, or a component of the dual-polarized antenna array 140 of FIG. 1. The dual-polarized antenna array 1720 may be part of an antenna array installed onboard an aircraft, such as aircraft 130 of FIG. 1, or may be used with other devices or systems. The dual-polarized antenna array 1720 may be part of any of the example antenna arrays described herein. For example, the dual-polarized antenna array 1720 may be an aspect or include one or more aspects of the dual-polarized antenna array 1500, 1600, 1620, 1640, or 1700 of FIGS. 15, 16A through 16C, and 17A. The digital dual-polarized antenna array 1720 may be one tile of a larger antenna array.

The dual-polarized antenna array 1720 includes a plurality of linear arrays 1705-*a* that include first sets of divided waveguides 240-1 and second sets of divided waveguides 245-1 coupled to a plurality of circuit cards 1520-*e*. In some examples, the parallel plate polarizer is constructed using an additive manufacturing technique, sheet metal plates, or stacked milled assemblies.

Figure 18:
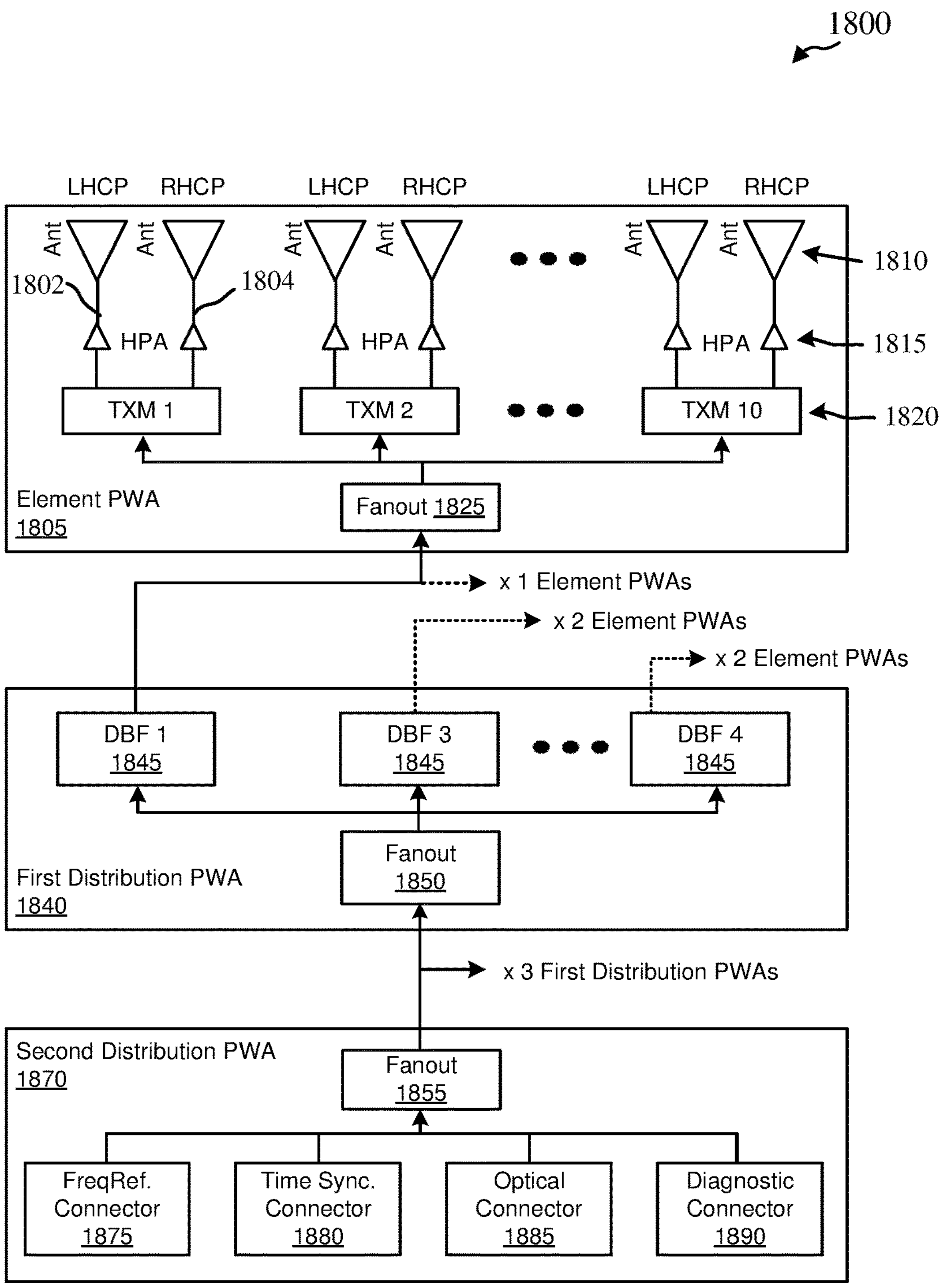
FIG. 18 illustrates a block diagram of an example scanning dual-polarized antenna array in accordance with aspects of the present disclosure.

FIG. 18 illustrates a block diagram of an example scanning dual-polarized antenna array 1800 in accordance with aspects of the present disclosure. The digital dual-polarized antenna array 1800 may be included in a waveguide device, such as the waveguide device 200 of FIG. 2, or a component of the dual-polarized antenna array 140 of FIG. 1. The digital dual-polarized antenna array 1800 may be part of an antenna array installed onboard an aircraft, such as aircraft 130 of FIG. 1, or may be used with other devices or systems. The dual-polarized antenna array 1800 may be part of any of the example antenna arrays described herein. For example, the digital dual-polarized antenna array 1800 may be an aspect or include one or more aspects of the digital dual-polarized antenna array 1500, 1600, 1620, 1640, 1700, or 1720 of FIGS. 15, 16A through 16C, 17A, and 17B.

The digital dual-polarized antenna array 1800 may include a plurality of element printed wiring assemblies (PWAs) 1805, a plurality of first distribution PWAs 1840, and a second distribution PWA 1870. Each first distribution PWA 1840 may be connected to a plurality of element PWAs 1805. The first distribution PWA may be an example of the distribution circuit 1540 of FIG. 15. The second distribution PWA 1870 may be referred to as a tile control circuit, and may be connected to a plurality of distribution PWAs 1840. The number of elements PWAs 1805 and first distribution PWAs 1840 included in the digital dual-polarized antenna array 1800 may depend on the size of the digital dual-polarized antenna array 1800. In some examples, the elements PWAs 1805, the first distribution PWAs 1840, and the second distribution PWA 1870 may be one or more aspects of the digital circuitry included on the back side of the antenna arrays described herein.

The element PWA 1805 may include plurality of antenna elements 1810 that are each associated with a polarization, such as a circular polarization or a linear polarization (RHCP and LHCP are illustrated as an example in FIG. 18). For example, a first antenna element 1810 may be associated with a first polarization 1802 and a second antenna element 1810 may be associated with a second polarization 1804. Each antenna waveguide (via the antenna elements 1810) may be connected to a high powered amplifier (HPA) 1815, which are part of transmitting antenna arrays (TXM) 1820. Each TXM 1820 may include two transmitters, and may include one or more DACs or upconverters. As shown in the example of FIG. 18, each element PWA 1805 includes ten TXMs 1820. In other examples, other numbers of TXMs 1820 may be included in an element PWA 1805. The number of TXMs 1820 may depend on the size of the digital dual-polarized antenna array 1800. The element PWA 1805 may also include a fanout circuit 1825 to connect to the distribution PWA 1840. As described herein, there may be many ports on the back side of the digital dual-polarized antenna array 1800.

In some examples, the element PWA 1805 may provide a first signal associated with the first polarization and a second signal associated with the second polarization to the at least the subset of the first distribution PWA 1840.

The distribution PWA 1840 may include four digital beamforming (DBF) circuits 1845. The DBF circuits 1845 may be used to control the beam direction of the digital dual-polarized antenna array 1800. Each DBF circuit 1845 may be connected to one or more element PWAs 1805. The DBF circuits 1845 may each independently control the phase and/or amplitude of signals transmitted via the antenna elements to which they are connected on the element PWAs 1805. The distribution PWA 1840 includes a fanout 1850 for connecting to the second distribution PWA 1870. In some examples, the DBF circuits 1845 may connect to a number of antenna elements driven by each element PWA 1805. The DBF circuits 1845 may independently control each element of an antenna array as described herein. For example, the DBF circuits 1845 may control each element in order to combine two circularly polarized signals to make a linear polarized signal at any angle. For example, each DBF circuit 1845 may output more than one signal that are provided to (e.g., via fanout circuit 1825) the TXM circuits 1820. In some examples, each signal generated by the DBF circuits 1845 may be sent to more than one TXM circuit 1820.

In some examples, there may be tiers of distribution PWAs 1840 for very large digital dual-polarized antenna arrays 1800. In other examples, the distribution PWAs 1840 may support other numbers of element PWAs 1805.

The second distribution PWA 1870 may be connected two four distribution PWAs, and includes a fanout circuit 1855 to do so. The second distribution PWA 1870 includes a frequency reference connector 1875, a time synchronization connector 1880, an optical connector 1885, and a diagnostic connector 1890. Each of these connectors may be configured to connect to one or more processors that may instruct the second distribution PWA 1870 on how to control the digital dual-polarized antenna array 1800.

Figure 19:
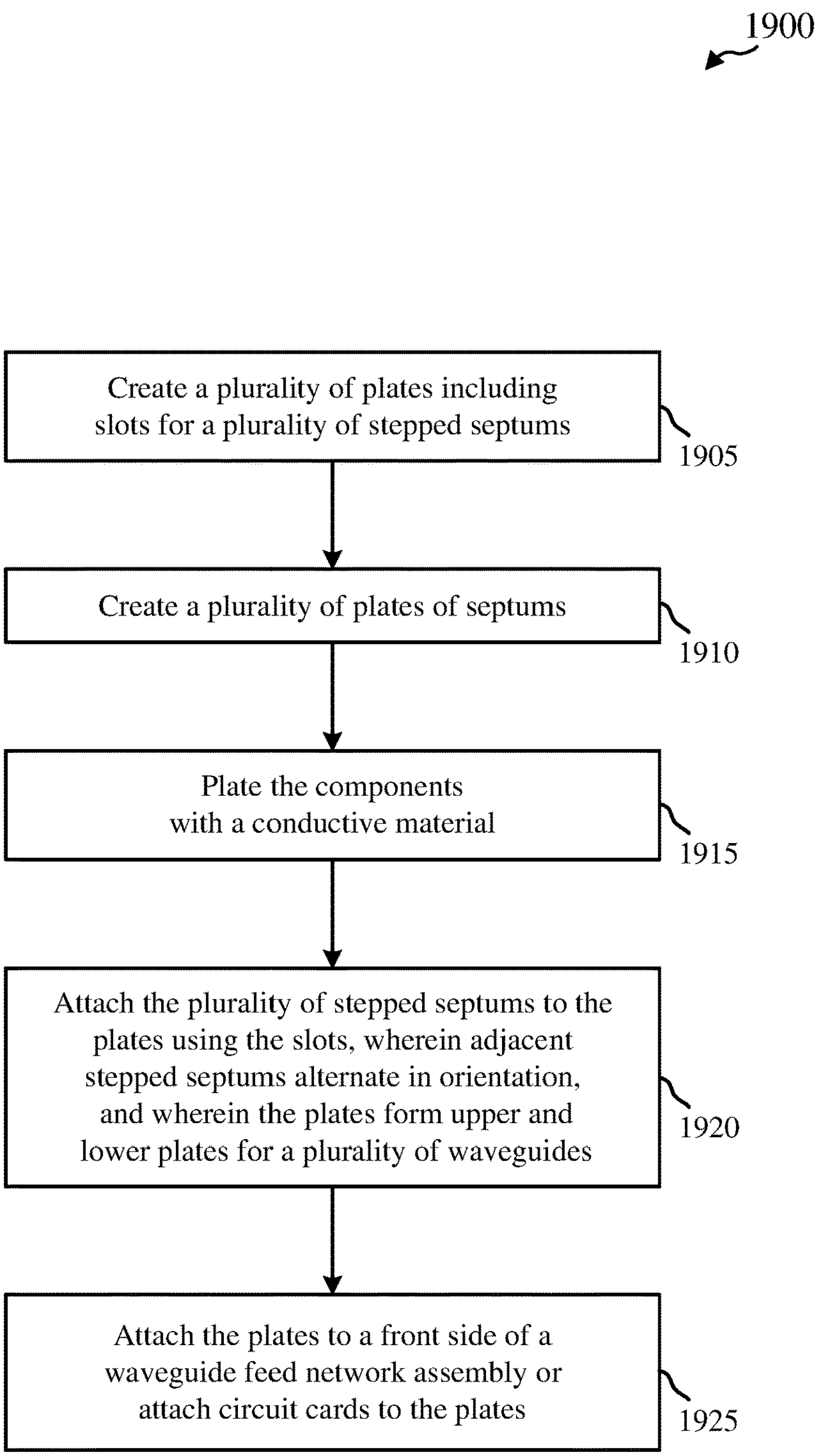
FIG. 19 shows a flowchart illustrating a method that supports manufacturing of a digital dual-polarized antenna array in accordance with aspects of the present disclosure.

FIG. 19 shows a flowchart of an example method 1900 for manufacturing an antenna array in accordance with various embodiments. The method 1900 may be used to create antenna arrays such as an example of the dual-polarized antenna arrays described in FIGS. 1-18. In some examples, a processor may execute one or more sets of codes to control machining equipment to perform the functions described below.

The method 1900 may include creating a plurality of plates at 1905. The plurality of plates may form the upper and lower plates for a linear array. A plate may function as both an upper plate for one linear array and a lower plate for an adjacent linear array. The plurality of plates may include slots in order to seat stepped septums within the plates. Those plates that are upper and lower plates may include as many slots as there are stepped septums for a larger antenna array. In examples of a plated assembly, such as in the example of FIG. 6, the plurality of plates 1905 may also include the septum plates. The septum plates may include two versions with 180 degrees opposite orientations, as described herein. Each of the plurality of plates may be formed as a single component. The plurality of plates may be formed from sheet metal. In some examples, the plurality of plates may be formed from metal or a non-conductive material such as plastic that is coated with metal.

At 1910, the method 1900 may include creating a plurality of plates of septums. The septums may be stepped, curved, angular, etc., as described herein. The plates of septums may include a number of stepped septum regions that is the same as a number of rows of the antenna array. For example, if the antenna array is to include 32 rows, the plates of septums may include 32 stepped septum regions (e.g., one for each linear array). In some examples, the septums may be aligned with each other (e.g., the alignment may be the same between different linear arrays), while in other examples they may be offset from each other. For example, where the septums are aligned, each of the septum regions for one type of plate may have a septum having the same orientation. In the offset example, each of the septum regions for one type of plate may have a septum of the opposite orientation. The number of plates of septums printed may correspond to the number of elements in each linear array. The plurality of septums may be formed from sheet metal. In some examples, the plurality of septums may be formed from a metal or a non-conductive material such as plastic, coated with metal.

At 1915, the method 1900 may further include plating the plates and plates of septums with a conductive material if they were made from a non-conductive material. The conductive material may be metal, for example.

At 1920, the method 1900 may include attaching the plurality of stepped septums to the plates using the slots, wherein adjacent stepped septums alternate in orientation, and wherein the plates form upper and lower plates for a plurality of waveguides. The method 1900 describes forming plates, other manufacturing processes may be used to form the antenna arrays as described herein, such as 3D printing. FIG. 6 shows an example of how the plates may be attached together to form a plate assembly. The plate assembly forms a plurality of first sets of divided waveguides and second sets of divided waveguides between the stepped septums and the plates. This may form a grid where circuit cards can be snapped to the grid. There are no walls separating the stepped septums, which provides a degree of freedom in design, manufacturing, and formation of the antenna array. The antenna arrays may be built in a tile format and stacked together.

At 1925, in some examples, the method 1900 may also include attaching the plate assembly to a front side of a waveguide feed network assembly (e.g., for a passive antenna array) or attaching one or more circuit cards to the plate assembly (e.g., for an active antenna array). The waveguide feed network assembly may be positioned to match up with the first and second sets of divided waveguides formed by the plate assembly. In some examples, the waveguide feed network assembly is also 3D printed. In some examples, the circuit cards may be attached to the back side of the waveguide feed network assembly. In additional examples, there could be portions of an antenna array with smaller waveguide feed networks that combine adjacent groups of 2, 4, 8, 16, etc., divided waveguides, that are part of a larger, active antenna array.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A dual-polarized antenna array comprising: a parallel plate polarizer, comprising: an upper plate having a first surface; a lower plate that is parallel to the upper plate and has a second surface opposing the first surface of the upper plate, wherein the lower plate is parallel to the upper plate; a plurality of stepped septums extending from the first surface of the upper plate to the second surface of the lower plate, each of the plurality of stepped septums having a first side surface and a second side surface, the plurality of stepped septums comprising a first set of stepped septums and a second set of stepped septums that are inverted relative to the first set of stepped septums; a plurality of first divided waveguides associated with a first polarization, each of the plurality of first divided waveguides having a first set of opposing walls formed by a first portion of the first surface of the upper plate and a first portion of the second surface of the lower plate and a second set of opposing walls formed by a portion of the first side surface of one of the first set of stepped septums and a portion of the first side surface of one of the second set of stepped septums; and a plurality of second divided waveguides associated with a second polarization, each of the plurality of second divided waveguides having a first set of opposing walls formed by a second portion of the first surface of the upper plate and a second portion of the second surface of the lower plate and a second set of opposing walls formed by a portion of the second side surface of one of the first set of stepped septums and a portion of the second side surface of one of the second set of stepped septums.

Aspect 2: The dual-polarized antenna array of aspect 1, wherein the dual-polarized antenna array comprises a plurality of parallel plate polarizers comprising the parallel plate polarizer, and for at least a subset of the plurality of parallel plate polarizers the upper plate of one of a pair of adjacent parallel plate polarizers and the lower plate of an other one of the pair of adjacent parallel plate polarizers are a same plate.

Aspect 3: The dual-polarized antenna array of aspect 2, wherein the plurality of stepped septums for the one of the pair of adjacent parallel plate polarizers are aligned with the plurality of stepped septums for the other one of the pair of adjacent parallel plate polarizers in a dimension parallel to the upper and lower plates of the first parallel plate polarizer.

Aspect 4: The dual-polarized antenna array of aspect 2, wherein the plurality of stepped septums for the one of the pair of adjacent parallel plate polarizers are offset from the plurality of stepped septums for the other one of the pair of adjacent parallel plate polarizers in a dimension parallel to the upper and lower plates of the plurality of parallel plate polarizers.

Aspect 5: The dual-polarized antenna array of any of aspects 2 through 4, further comprising: a plurality of antenna feeds within respective waveguides of the plurality of first divided waveguides and the plurality of second divided waveguides.

Aspect 6: The dual-polarized antenna array of aspect 5, further comprising: a plurality of circuit cards, wherein each of the plurality of circuit cards is coupled with a subset of the plurality of antenna feeds.

Aspect 7: The dual-polarized antenna array of aspect 6, wherein each of the plurality of circuit cards comprises an electrical beam forming network.

Aspect 8: The dual-polarized antenna array of aspect 7, wherein the electrical beam forming network of the each of the plurality of circuit cards comprises a plurality of beamforming circuits, each beamforming circuit associated with one or more of the antenna feeds.

Aspect 9: The dual-polarized antenna array of any of aspects 6 through 8, further comprising: a plurality of distribution circuits, wherein each of the plurality of distribution circuits is coupled with at least a subset of the plurality of circuit cards and provides a first signal associated with the first polarization and a second signal associated with the second polarization to the at least the subset of the plurality of circuit cards.

Aspect 10: The dual-polarized antenna array of any of aspects 6 through 9, wherein the each of the plurality of circuit cards is coupled with the subset of the plurality of antenna feeds that are within the respective waveguides of the plurality of first divided waveguides and the plurality of second divided waveguides for one parallel plate polarizer of the plurality of parallel plate polarizers.

Aspect 11: The dual-polarized antenna array of any of aspects 6 through 10, wherein the each of the plurality of circuit cards comprises a plurality of analog-to-digital converters (ADCs) and a plurality of digital-to-analog converters (DACs), and each of the plurality of ADCs and the plurality of DACs is coupled with one or more of the plurality of antenna feeds.

Aspect 12: The dual-polarized antenna array of any of aspects 2, further comprising: a first waveguide feed network coupled between a first common port and the plurality of first divided waveguides; and a second waveguide feed network coupled between a second common port and the plurality of second divided waveguides.

Aspect 13: The dual-polarized antenna array of aspect 12, wherein the dual-polarized antenna array comprises: a plurality of parallel assemblies, wherein each parallel assembly comprises a stepped septum from each of the plurality of parallel plate polarizers and at least a portion of a combiner/divider of the first waveguide feed network or the second waveguide feed network.

Aspect 14: The dual-polarized antenna array of any of aspects 2 through 13, wherein the dual-polarized antenna array comprises: a plurality of first plates comprising upper and lower plates of the plurality of parallel plate polarizers, each of the plurality of first plates having slots along a first edge; and a plurality of second plates, each of the plurality of second plates comprising stepped septums from a plurality of rows of the plurality of parallel plate polarizers, and each of the plurality of second plates inserted into the slots of the plurality of first plates.

Aspect 15: The dual-polarized antenna array of any of aspects 1 through 14, wherein the parallel plate polarizer is constructed using an additive manufacturing technique.

Aspect 16: The dual-polarized antenna array of any of aspects 1 through 15, wherein the first polarization is a first circular polarization and the second polarization is a second circular polarization.

Aspect 17: The dual-polarized antenna array of any of aspects 1 through 14, wherein the first polarization is a first linear polarization and the second polarization is a second linear polarization.

Aspect 18: The dual-polarized antenna array of any of aspects 1 through 17, further comprising: a plurality of dielectric inserts located at least partially in a transition region of the plurality of stepped septums.

Aspect 19: The dual-polarized antenna array of any of aspects 1 through 18, wherein a transition region for each of the stepped septums has a length in an axial dimension orthogonal to a plane of an aperture of the dual-polarized antenna array that is less than a wavelength of a carrier frequency for the dual-polarized antenna array.

Aspect 20: The dual-polarized antenna array of any of aspects 1 through 19, wherein a first divided waveguide of the plurality of first divided waveguides shares a first stepped septum of the plurality of stepped septums with a second divided waveguide of the plurality of second divided waveguides and shares a second stepped septum of the plurality of stepped septums with a third divided waveguide of the plurality of second divided waveguides, the first divided waveguide is adjacent to the second divided waveguide and the third divided waveguide.

Aspect 21: The dual-polarized antenna array of any of aspects 1 through 20, wherein the first set of stepped septums and the second set of stepped septums are interleaved along a direction parallel to the upper plate and the lower plate.

Aspect 22: An apparatus comprising a processor; memory coupled with the processor; and instructions stored in the memory and executable by the processor to cause the apparatus to perform a method of any of aspects 1 through 21.

Aspect 23: An apparatus comprising at least one means for performing a method of any of aspects 1 through 21.

Aspect 24: A non-transitory computer-readable medium storing code the code comprising instructions executable by a processor to perform a method of any of aspects 1 through 21.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

As used in the description herein, the term "parallel" is not intended to suggest a limitation to precise geometric parallelism. For instance, the term "parallel" as used in the present disclosure is intended to include typical deviations from geometric parallelism relating to such considerations as, for example, manufacturing and assembly tolerances. Furthermore, certain manufacturing process such as molding or casting may require positive or negative drafting, edge chamfers and/or fillets, or other features to facilitate any of the manufacturing, assembly, or operation of various components, in which case certain surfaces may not be geometrically parallel, but may be parallel in the context of the present disclosure.

Similarly, as used in the description herein, the terms "orthogonal" and "perpendicular", when used to describe geometric relationships, are not intended to suggest a limitation to precise geometric perpendicularity. For instance, the terms "orthogonal" and "perpendicular" as used in the present disclosure are intended to include typical deviations from geometric perpendicularity relating to such considerations as, for example, manufacturing and assembly tolerances. Furthermore, certain manufacturing process such as molding or casting may require positive or negative drafting, edge chamfers and/or fillets, or other features to facilitate any of the manufacturing, assembly, or operation of various components, in which case certain surfaces may not be geometrically perpendicular, but may be perpendicular in the context of the present disclosure.

As used in the description herein, the term "orthogonal," when used to describe electromagnetic polarizations, are meant to distinguish two polarizations that are separable. For instance, two linear polarizations that have unit vector directions that are separated by 90 degrees can be considered orthogonal. For circular polarizations, two polarizations are considered orthogonal when they share a direction of propagation, but are rotating in opposite directions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A dual-polarized antenna array comprising:

a parallel plate polarizer, comprising:

an upper plate having a first surface;

a lower plate that is parallel to the upper plate and has a second surface opposing the first surface of the upper plate;

a plurality of stepped septums extending from the first surface of the upper plate to the second surface of the lower plate, each of the plurality of stepped septums having a first side surface and a second side surface, the plurality of stepped septums comprising a first set of stepped septums and a second set of stepped septums that are inverted relative to the first set of stepped septums;

a plurality of first divided waveguides associated with a first polarization, each of the plurality of first divided waveguides having a first set of opposing walls formed by a first portion of the first surface of the upper plate and a first portion of the second surface of the lower plate and a second set of opposing walls formed by a portion of the first side surface of one of the first set of stepped septum and a portion of the first side surface of one of the second set of stepped septums; and a plurality of second divided waveguides associated with a second polarization, each of the plurality of second divided waveguides having a first set of opposing walls formed by a second portion of the first surface of the upper plate and a second portion of the second surface of the lower plate and a second set of opposing walls formed by a portion of the second side surface of one of the first set of stepped septums and a portion of the second side surface of one of the second set of stepped septums.

2. The dual-polarized antenna array of claim 1, wherein the dual-polarized antenna array comprises a plurality of parallel plate polarizers comprising the parallel plate polarizer, and wherein, for at least a subset of the plurality of parallel plate polarizers the upper plate of one of a pair of adjacent parallel plate polarizers and the lower plate of an other one of the pair of adjacent parallel plate polarizers are a same plate.

3. The dual-polarized antenna array of claim 2, wherein the plurality of stepped septums for the one of the pair of adjacent parallel plate polarizers are aligned with the plurality of stepped septums for the other one of the pair of adjacent parallel plate polarizers in a dimension parallel to the upper and lower plates of the plurality of parallel plate polarizers.

4. The dual-polarized antenna array of claim 2, wherein the plurality of stepped septums for the one of the pair of adjacent parallel plate polarizers are offset from the plurality of stepped septums for the other one of the pair of adjacent parallel plate polarizers in a dimension parallel to the upper and lower plates of the plurality of parallel plate polarizers.

5. The dual-polarized antenna array of claim 2, further comprising:

a plurality of antenna feeds within respective waveguides of the plurality of first divided waveguides and the plurality of second divided waveguides.

6. The dual-polarized antenna array of claim 5, further comprising:

a plurality of circuit cards, wherein each of the plurality of circuit cards is coupled with a subset of the plurality of antenna feeds.

7. The dual-polarized antenna array of claim 6, wherein each of the plurality of circuit cards comprises an electrical beam forming network.

8. The dual-polarized antenna array of claim 7, wherein the electrical beam forming network of the each of the plurality of circuit cards comprises a plurality of beamforming circuits, each beamforming circuit associated with one or more of the antenna feeds.

9. The dual-polarized antenna array of claim 6, further comprising:

a plurality of distribution circuits, wherein each of the plurality of distribution circuits is coupled with at least a subset of the plurality of circuit cards and provides a first signal associated with the first polarization and a second signal associated with the second polarization to the at least the subset of the plurality of circuit cards.

10. The dual-polarized antenna array of claim 6, wherein the each of the plurality of circuit cards is coupled with the subset of the plurality of antenna feeds that are within the respective waveguides of the plurality of first divided waveguides and the plurality of second divided waveguides for one parallel plate polarizer of the plurality of parallel plate polarizers.

11. The dual-polarized antenna array of claim 6, wherein the each of the plurality of circuit cards comprises a plurality of analog-to-digital converters (ADCs) and a plurality of digital-to-analog converters (DACs), and wherein each of the plurality of ADCs and the plurality of DACs is coupled with one or more of the plurality of antenna feeds.

12. The dual-polarized antenna array of claim 2, further comprising:

a first waveguide feed network coupled between a first common port and the plurality of first divided waveguides; and a second waveguide feed network coupled between a second common port and the plurality of second divided waveguides.

13. The dual-polarized antenna array of claim 12, wherein the dual-polarized antenna array comprises:

a plurality of parallel assemblies, wherein each parallel assembly comprises a stepped septum from each of the plurality of parallel plate polarizers and at least a portion of a combiner/divider of the first waveguide feed network or the second waveguide feed network.

14. The dual-polarized antenna array of claim 2, wherein the dual-polarized antenna array comprises:

a plurality of first plates comprising upper and lower plates of the plurality of parallel plate polarizers, each of the plurality of first plates having slots along a first edge; and a plurality of second plates, each of the plurality of second plates comprising stepped septums from a plurality of rows of the plurality of parallel plate polarizers, and each of the plurality of second plates inserted into the slots of the plurality of first plates.

15. The dual-polarized antenna array of claim 1, wherein the parallel plate polarizer is constructed using an additive manufacturing technique.

16. The dual-polarized antenna array of claim 1, wherein the first polarization is a first circular polarization and the second polarization is a second circular polarization.

17. The dual-polarized antenna array of claim 1, wherein the first polarization is a first linear polarization and the second polarization is a second linear polarization.

18. The dual-polarized antenna array of claim 1, further comprising:

a plurality of dielectric inserts located at least partially in a transition region of the plurality of stepped septums.

19. The dual-polarized antenna array of claim 1, wherein a transition region for each of the stepped septums has a length in an axial dimension orthogonal to a plane of an aperture of the dual-polarized antenna array that is less than a wavelength of a carrier frequency for the dual-polarized antenna array.

20. The dual-polarized antenna array of claim 1, wherein a first divided waveguide of the plurality of first divided waveguides shares a first stepped septum of the plurality of stepped septums with a second divided waveguide of the plurality of second divided waveguides and shares a second stepped septum of the plurality of stepped septums with a third divided waveguide of the plurality of second divided waveguides, wherein the first divided waveguide is adjacent to the second divided waveguide and the third divided waveguide.

21. The dual-polarized antenna array of claim 1, wherein the first set of stepped septums and the second set of stepped septums are interleaved along a direction parallel to the upper plate and the lower plate.

* * * * *